US009942637B2

(12) United States Patent
Moro

(10) Patent No.: US 9,942,637 B2
(45) Date of Patent: Apr. 10, 2018

(54) L-BRACKETS FOR MOUNTING WITH EXTENDED MOBILITY RANGE

(71) Applicant: Harman International Industries, Incorporated, Stamford, CT (US)

(72) Inventor: Jerry Moro, Moorpark, CA (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 14/983,279

(22) Filed: Dec. 29, 2015

(65) Prior Publication Data

US 2017/0188122 A1 Jun. 29, 2017

(51) Int. Cl.
*F16M 13/00* (2006.01)
*H04R 1/02* (2006.01)
*F16M 13/02* (2006.01)

(52) U.S. Cl.
CPC ............ *H04R 1/026* (2013.01); *F16M 13/02* (2013.01); *H04R 2201/021* (2013.01)

(58) Field of Classification Search
CPC ......... F16B 5/0036; F16B 12/34; F16B 21/09
USPC ............... 248/224.8, 220.22, 297.21, 225.11
See application file for complete search history.

(56) References Cited

U.S. PATENT DOCUMENTS

| | | | | |
|---|---|---|---|---|
| 4,301,767 A * | 11/1981 | Willinger | A01K 63/065 | 119/245 |
| 6,364,276 B1 * | 4/2002 | Polzin | A63J 21/00 | 248/200 |
| 6,398,174 B1 * | 6/2002 | Emalfarb | A47G 7/044 | 248/214 |
| 8,201,788 B2 * | 6/2012 | Carnevali | F16B 5/0635 | 248/223.41 |
| 9,075,290 B1 * | 7/2015 | Thieman | G03B 17/561 | |
| 9,107,526 B2 * | 8/2015 | Rife | A47G 29/083 | |

* cited by examiner

*Primary Examiner* — Steven M Marsh
(74) *Attorney, Agent, or Firm* — McCoy Russell LLP

(57) ABSTRACT

Embodiments are disclosed that relate to mounting brackets for speakers. In some embodiments, a mounting bracket includes a first plate portion; a second plate portion, the second plate portion perpendicular to the first plate portion; and a slot extending continuously from the first plate portion to the second plate portion.

18 Claims, 14 Drawing Sheets

L-BRACKETS FOR MOUNTING WITH EXTENDED MOBILITY RANGE

FIELD

The present disclosure generally relates to mounting brackets.

BACKGROUND

Architectural speakers are designed for mounting to walls or ceilings in order to free up floor space and reduce sound interference, thereby improving acoustic user experience and speaker performance. Such wall and ceiling installations are increasingly utilized in commercial, as well as residential, buildings.

Typically, when installing a speaker in a wall or in a ceiling, the speaker enclosure is mounted to the dry wall with brackets. However, some rooms have special reflective or absorption materials in front of existing dry wall that add thickness to the dry wall. Conventional brackets may have limited extension range for position adjustment. Thus, with conventional brackets, when architectural speakers are mounted onto dry wall that has additional thickness, fabrication of additional interior wall supports may be required to allow the in-wall or in-ceiling system to extend outward for optimal positioning of the speakers with respect to dry wall. Consequently, cost and time for product installation is increased.

SUMMARY

Embodiments are disclosed for a mounting bracket with increased extension range. In some embodiments, a mounting bracket includes a first plate portion; a second plate portion, the second plate portion positioned at an angle with respect to the first plate; and a slot extending continuously from the first plate portion to the second plate portion. The slot may include a first width for a first slot portion of the slot on the first plate portion and a second width for a second slot portion of the slot on the first plate portion, the first width less than the second width.

In additional or alternative embodiments, a mounting bracket system includes an angled plate including a slot having a first end on a first portion of the angled plate and a second end on a second portion perpendicular to the first portion; and a nut plate including a base plate and a plurality of shafts perpendicular to the base plate, the nut plate linearly movable within the slot and along a longitudinal axis of the angled plate.

In still further additional or alternative embodiments, a mounting system includes a mounting bracket including a slot extending from a first portion of the bracket into a second perpendicular portion of the bracket, the second portion coupled to a preconstruction bracket coupled to a dry wall; a nut plate including a base plate perpendicular to a plurality of shafts with internal threads, the plurality of shafts inserted into the slot in the first portion and into a plurality of holes within a side wall of a housing including an in-wall application module; and a plurality of screws coupling the housing to the bracket via the plurality of shafts.

It is to be understood that the features mentioned above and those to be explained below can be used not only in the respective combinations indicated, but also in other combinations or in isolation. These and other objects, features, and advantages of the invention will become apparent in light of the detailed description of the embodiment thereof, as illustrated in the accompanying drawings.

BRIEF DESCRIPTION OF THE DRAWINGS

The foregoing and other features of embodiments will become more apparent from the following detailed description of non-limiting embodiments when read in conjunction with the accompanying drawings. In the drawings, like or identical reference numerals refer to like or identical elements.

DETAILED DESCRIPTION

As described above, devices, such as architectural speakers, are mounted on to walls and ceilings by utilizing a bracket to couple a device enclosure with a dry wall of the wall. Certain wall systems include additional materials that increase a thickness of the dry wall. In order to achieve increased range of extension for positioning the device such that a front surface of the device forms a frame around the drywall or is flush with the drywall, the present disclosure describes an in-wall mounting system including a mounting bracket with a slot that extends from a first section of the mounting bracket into a second perpendicular section of the mounting bracket.

Figure 1A:
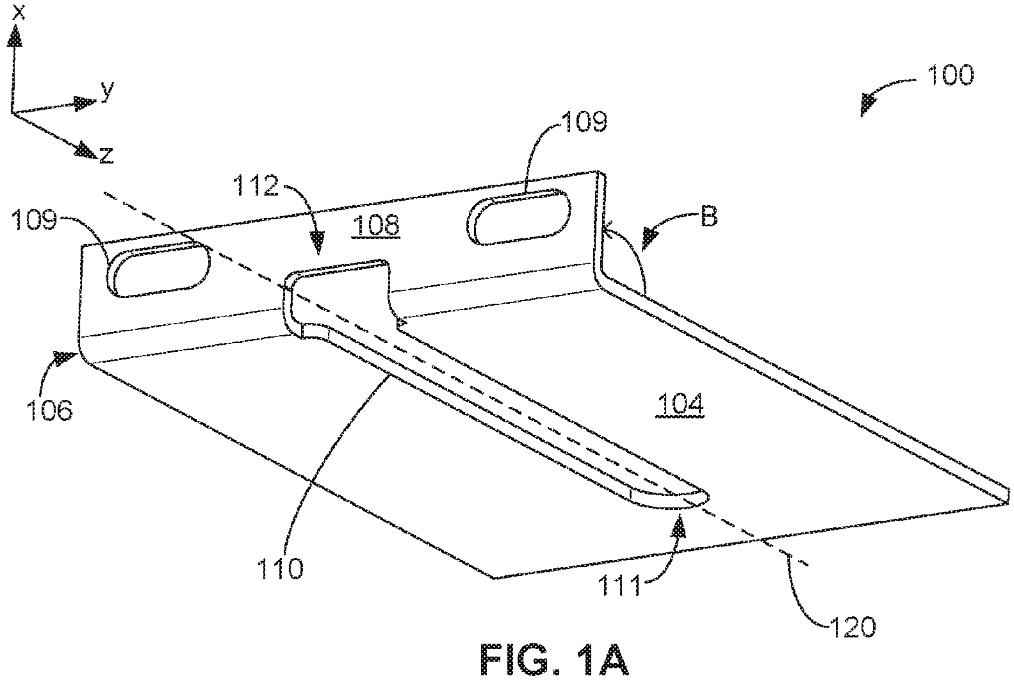
FIGS. 1A-1D show different views of a mounting bracket in accordance with one or more embodiments of the present disclosure.

FIGS. 1A-1D illustrate different views of a mounting bracket 100 in accordance with one or more embodiments of the present disclosure. Specifically, FIG. 1A is a bottom perspective view of mounting bracket 100. Mounting bracket 100 may be configured as an angled plate forming an L-shape, for example. Mounting bracket may comprise a first plate portion 104, a second plate portion 108, and a junction portion 106. Second plate portion 108 may be positioned at an angle B with respect to first plate portion. In one example, the angle B may be 90 degrees. That is, second plate portion 108 may be perpendicular to first plate portion 104. Junction plate portion 106 is in between first portion 104 and second portion 108, and may comprise a bent portion of the mounting bracket 100. That is, junction portion may form the angle B between the first and the second plate portions.

In one example, first plate portion 104, junction plate portion 106, and second plate portion 108 may be formed by bending a single plate. For example, a portion of the metal plate may be bent at angle B to form first portion 104, junction portion 106, and second portion 108. Thus, mounting bracket may be formed as a single unitary member. In another example, first plate portion 104 and second plate portion 108 may be separate and may be welded together at angle B, thereby forming junction plate portion 106.

Further, a surface area of first plate portion 104 may be greater than a surface area of second plate portion 108. Further, a surface area of the junction portion may be less than each of the surface areas of first plate portion 104 and second plate portion 108. It will be appreciated that the configuration of mounting bracket 100 shown in FIG. 1, where the surface area of the first plate portion is greater than the surface area of the second plate portion, is provided as an example and is not intended to be limiting in any way. For example, embodiments where the surface area of the second portion is greater than or equal to the surface area of first portion are also within the scope of the present disclosure.

Further, a thickness of the mounting bracket may be constant. That is, a thickness of the first portion, the second portion and the junction portion may be the same. However, it will be appreciated that embodiments where the mounting bracket is configured with varying thickness is also within the scope of this disclosure.

Slots 109 may be included within second plate portion 108 for receiving bolts and nuts for attaching mounting bracket 100 to a structure or a support, such as a pre-construction bracket, that may be coupled to a dry wall. In some embodiments, mounting bracket may be attached to a framing member, such as a stud, in a wall. In this example, slot 109 is shown as having an obround shape. That is, slot 109 may have two parallel sides and two semicircular sides connecting the two parallel sides on each end. However, other shapes, such as a round, are also possible.

A slot 110 that extends from a portion of first plate portion 104 through junction plate portion 106 and into second plate portion 108 may be included in mounting bracket 100. Slot 110 may run continuously from first plate portion 104 to second plate portion 108. Thus, slot 110 may form an angled channel within mounting bracket 100. In other words, Slot 110 may be a folded slot continuing from first plate portion 104 and folding along the bend of junction portion 106 and extending into the second plate portion 108. Further, the slot extends only partially through each of the first and second plate portions in a single, continuously uninterrupted and straight path. Slot 110 may be utilized to receive a nut plate, such as nut plate 200, further described below at FIGS. 2A and 2B. The nut plate may be movable forward and backward along a longitudinal axis 120 of mounting bracket 100.

Figure 2A:
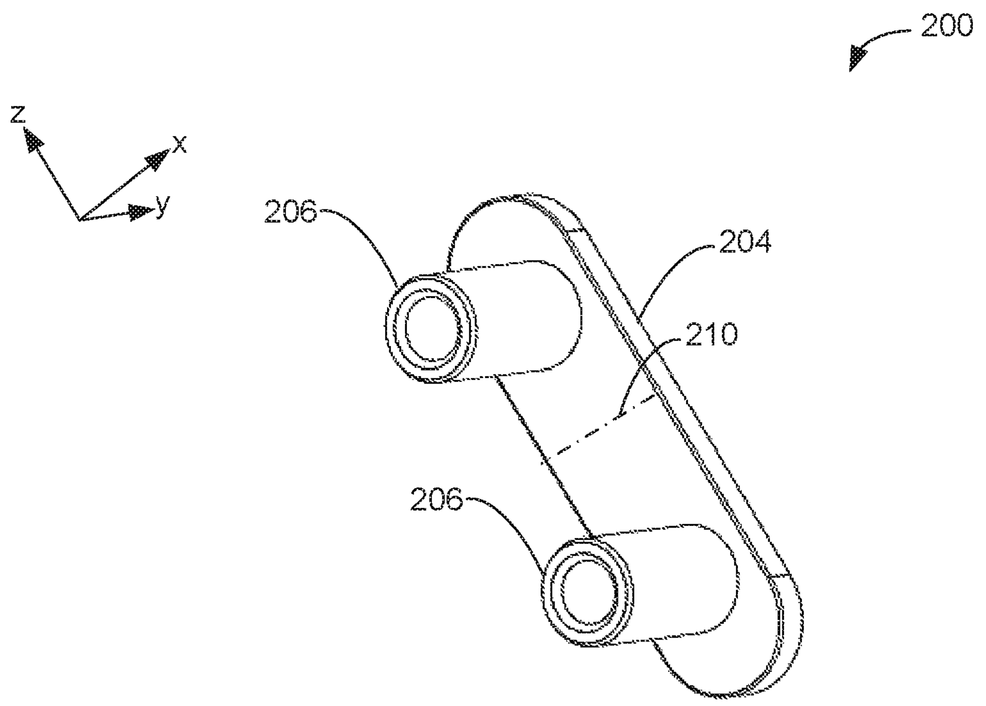
FIG. 2A-2B show different views of a nut plate utilized along with the mounting bracket of FIGS. 1A-1D in accordance with one or more embodiments of the present disclosure.
Figure 2B:
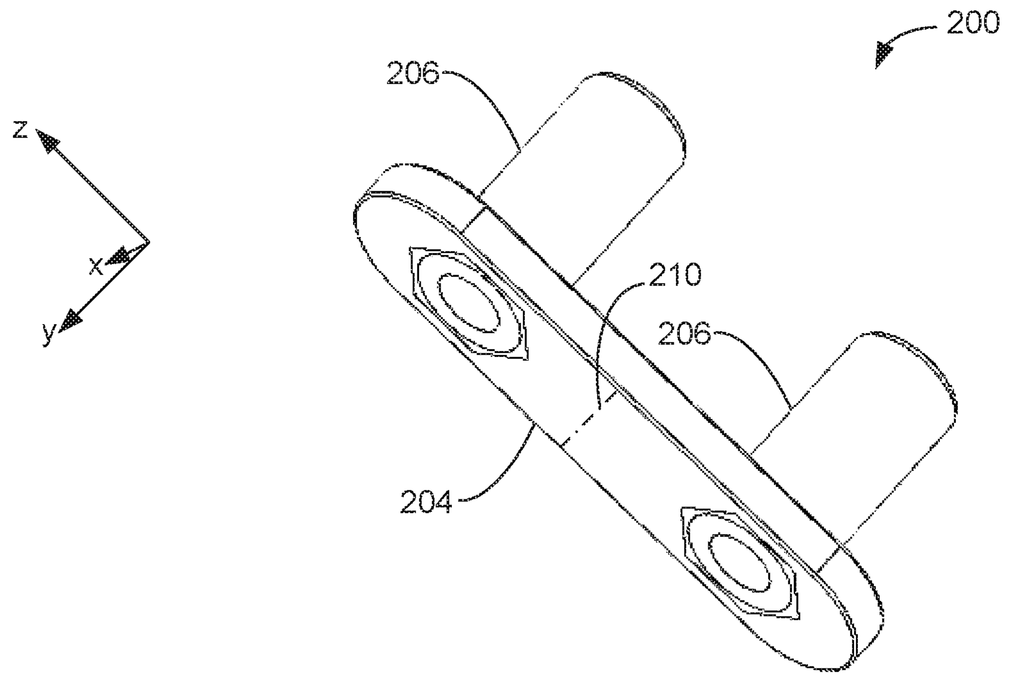

Referring now to FIGS. 2A and 2B, a nut plate 200 for use with mounting bracket 100 is shown. Nut plate 200 may include a base plate 204 and two shafts 206. As shown, base plate 204 may be obround in shape. That is, base plate 204 may have two parallel sides and two semicircular sides connecting the two parallel sides on each end. It will be appreciated that base plate 204 may assume other geometries, such as a rectangle, for example.

Shafts 206 may be positioned perpendicular to the base plate. Specifically, a length of each of the shafts 206 may be perpendicular to a length of base plate. For example, if the length of the base plate is along the Z axis, the shafts 206 may be positioned along X axis. While the present example shows nut plate 200 including two shafts, the nut plate may be configured with any number of shafts, such as one shaft or more than two shafts.

Each shaft 206 may be a hollow cylinder and may include internal threads for receiving a screw. Shafts 206 may be inserted into slot 110 of mounting bracket 100 such that a portion of a surface of base plate 204 facing mounting bracket 100 is in face-sharing contact with a portion of top surface of first plate portion 104 surrounding slot 110. A length of the base plate may be based on a length of slot 110 and a desired movement distance. A length of shaft 206 may be based on a thickness of a wall of a housing for a device that may be mounted using mounting bracket 100 and nut plate 200. For example, the housing may include holes into which the shafts may be inserted. Further an outer diameter of shaft 206 may be based on a diameter of holes of the housing.

Nut plate 200 may be moveable along longitudinal axis 120 of mounting bracket. The longitudinal axis may be the Z-axis. A score line 210 may be indicated on the base plate such that score line 210 is visible to a user during installation of the device. In one example, score line 210 may be indicated on the surface of base plate 204 that is in face-sharing contact with first plate portion 104 and on an opposite surface of base plate 204 that is opposite to the surface that is in face-sharing contact with first plate portion 104. In some examples, score line 210 may be additionally indicated on surfaces perpendicular to the surface of base plate 204 and the opposite surface of base plate 204. The score line may provide an indication of maximum forward movement of the nut plate.

Returning to FIG. 1A, a width of slot 110 may be variable. Specifically, slot 110 may comprise a first width for a first portion of the slot within first plate portion 104, and a second width for a remaining portion of the slot on first plate portion 104. Further, the width of slot 110 within junction plate portion 106 and the width of the slot within second plate portion 108 may be the second width. The second width may be greater than the first width, and the second width may be based on a width of the nut plate that moves along the slot. Specifically, the second width may accommodate a through movement of the nut plate past junction portion 106 and second plate portion 108 along the longitudinal axis 120 of mounting bracket 100. That is, slot 110 may be formed such that the movement of the nut plate is not blocked by junction portion 106 and second plate portion 108. Further, a length of the slot in the second plate portion (that is, a distance by which the slot extends through the second plate portion) may be based on a thickness or height of a base plate of the nut plate. For example, as a thickness of the base plate increases, the length of slot in the second plate portion increases. Still further, a shape of the slot in second plate portion may be based on a shape of the base plate of the nut plate. For example, the slot may be cut so as to accommodate a through movement of the base plate. That is, the shape of the slot may be such that, it does not restrict a through linear movement of the base plate beyond a bent edge of the junction plate portion through the portion of the slot on the second plate portion along the longitudinal axis 120. A length of the slot in the first portion may be based on a length of base plate of the nut plate and based on a desired moving range of the nut plate.

Within first plate portion 104, slot 110 may be positioned along longitudinal axis 120 and may extend along into the second plate portion through the junction plate portion. Thus, within second plate portion 108, slot 110 may be positioned along an axis perpendicular to longitudinal axis in the transverse plane. Further, the slot may be positioned on a central portion of mounting bracket 100 such that a distance from any midpoint of the width of the slot to either side edges of mounting bracket 100 (that is, a first bracket edge to the right of the slot and a second edge to the left of the slot) is the same. That is, any midpoint of width of slot 110 may be equidistant from both the side edges of mounting bracket 100. While the above example shows the slot 110 positioned centrally in the width of the bracket, the position of the slot may be biased to one side or the other if necessary.

Figure 1B:
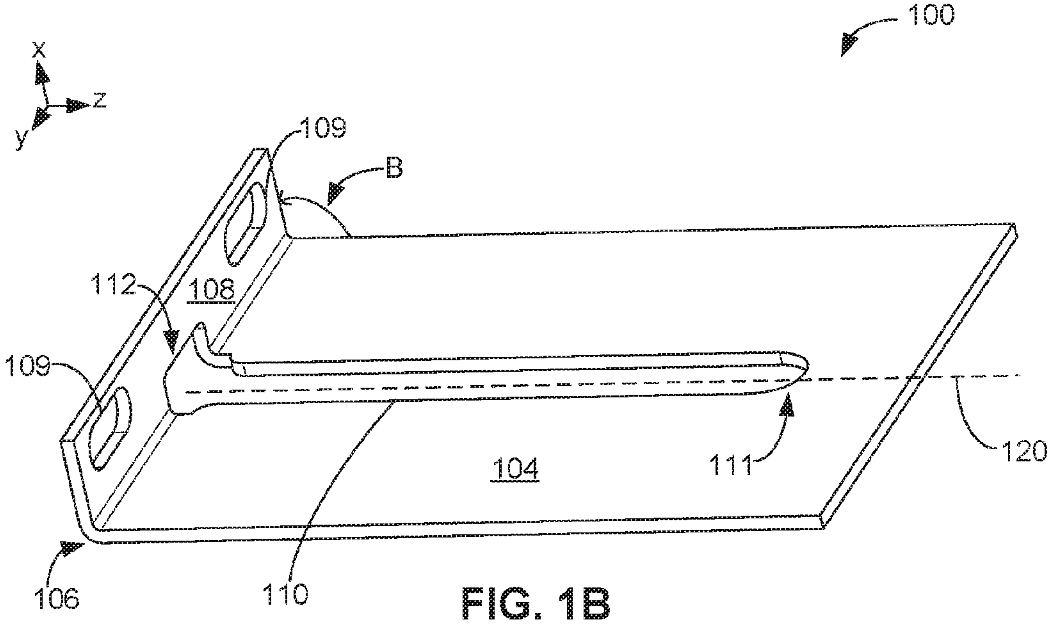

Further, a first end 111 of slot 110 on first plate portion 104 may be semi-circular in shape, while a second end 112 of slot 110 on second plate portion 108 may be flat FIG. 1B is a top perspective view of mounting bracket 100. This perspective view further illustrates a shape of slot 110 and how the slot curves along junction portion 106 of mounting bracket 100. The view also illustrates how the width of the slot changes. Specifically, the width of slot 110 increases closer to junction portion 106, and remains at the increased width in junction portion 106 and second plate portion 108.

Figure 1C:
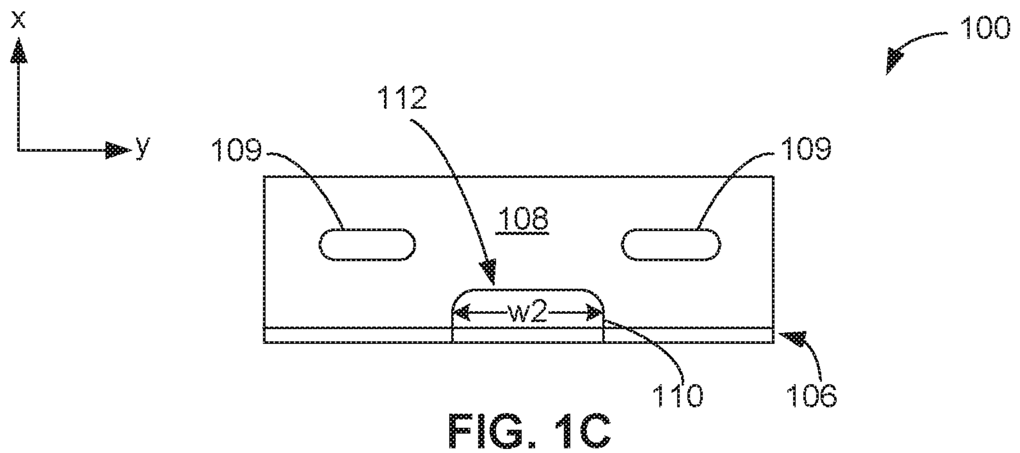

FIG. 1C is a front view of mounting bracket 100. The front view shows junction portion 106 and second plate portion 108. The front view further illustrates a position of slot 110 within junction portion 106 and second plate portion 108. The front view also illustrates a shape and a second width w2 of slot 110 in junction portion 106 and second plate portion 108. As shown, second end 112 may be flat. However, embodiments where second end 112 is curved are also possible.

Figure 1D:
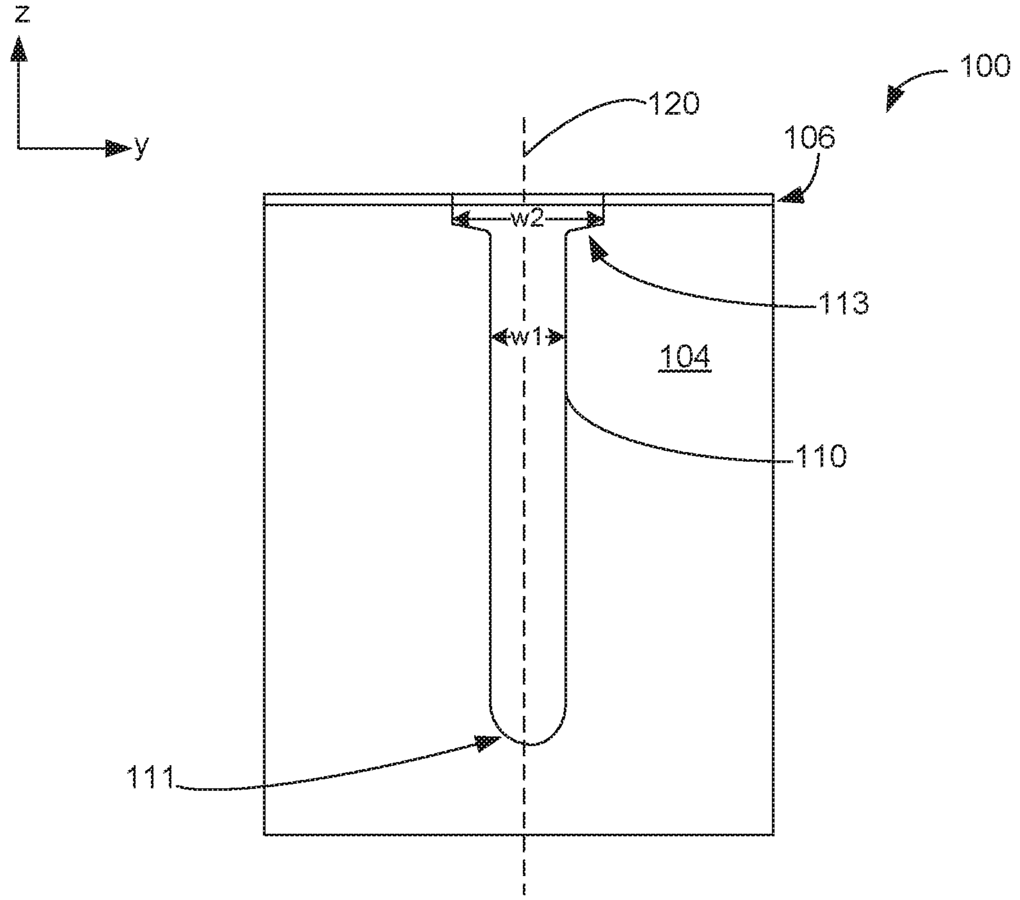

FIG. 1D is a top view of mounting bracket 100. The top view illustrates first plate portion 104 and junction plate portion 106. The top view further illustrates how the width of slot 110 changes. As shown, within first plate portion, slot 110 may have a first width w1 for a first slot portion and second width w2 for a second slot portion. The transition from first width w1 to second width w2 on the first plate portion may be gradual. That is, the width of the slot may increase from first width to second width via one or more intermediate widths in between the first width and the second width. In other words, an edge 113 of slot 110 between the end of the first width and the beginning of the second width may be at an acute angle with respect to longitudinal axis 120. Further, in another embodiment, the transition from the first width to the second width on the first plate portion may be sharp. That is, an edge of slot 110 between the end of the first width and the beginning of the second width may be at right angles (90 degrees) with respect to longitudinal axis 120.

Figure 3:
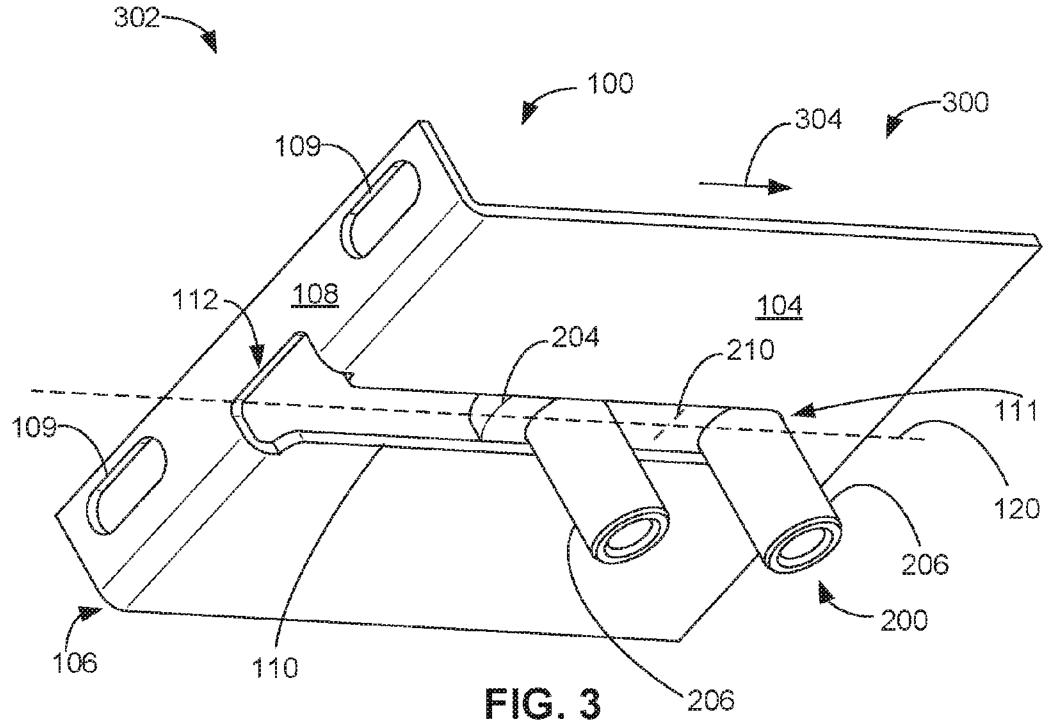
FIG. 3 shows a mounting bracket system including the mounting bracket and the nut plate in a first position in accordance with one or more embodiments of the present disclosure.

Referring now FIG. 3, a mounting bracket system 302 including mounting bracket 100 and nut plate 200 is shown with nut plate 200 in a first position 300. First position 300 may also be referred to as full backward position. As shown, shafts 206 of nut plate 200 are inserted into slot 110 such that base plate 204 is in face sharing contact with a surface of first plate portion 104 around slot 110. That is, shafts 206 may protrude through the slot 110 in a direction opposite to second plate portion 108. As discussed above, nut plate may be moveable along longitudinal axis 120. Nut plate 200 may be moved by a user to a desired position along slot 110. The desired position may be any position including and in between the first position 300 shown at FIG. 3 and a second position shown at FIG. 4 and described below.

At first position 300, a first shaft of the two shafts 206 may be in face-sharing contact with a first end 111 of slot 110 on first plate portion 104. That is, when nut plate is at the first position, movement of nut plate 200 along longitudinal axis 120 in a backward direction, indicated by arrow 304, may be restricted by first end 111. As such, during a backward movement, nut plate 200 travels away from the junction portion 106 and second portion 108 towards first end 111.

Figure 4:
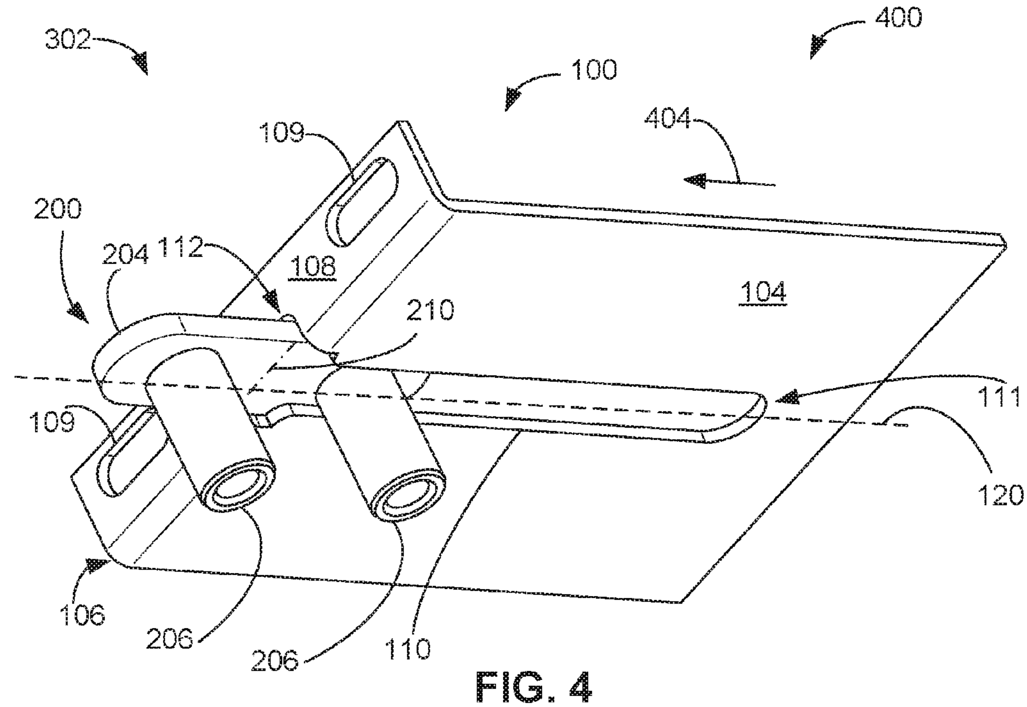
FIG. 4 shows the mounting bracket system of FIG. 3 including the mounting bracket and the nut plate in a second position in accordance with one or more embodiments of the present disclosure.

Turning to FIG. 4, mounting bracket system 302 including mounting bracket 100 and nut plate 200 is shown with nut plate 200 in a second position. Nut plate 200 may be moved by a user, for example. Second position 400 may be based on score line 210. Specifically, at the second position, score line 210 may be aligned with an outer edge of mounting bracket 100 such that score line 210 does not extend beyond second plate portion 108. At second position 400, a portion of base plate 204 and a second shaft of shafts 206 may protrude beyond the bent junction portion 106 through slot 110 within junction plate portion 106 and second plate portion 108. That is, at second position 400, a portion of base plate and the second shaft may protrude out of slot 110. A remaining portion of base plate 204 and the first shaft of shafts 206 may be within slot 110. Thus, in order to achieve the second position 400 from first position 300, nut plate 200 may be pushed through channels of slot 110 within junction portion 106 and second portion 108 along longitudinal axis 120 in a forward direction, indicated by arrow 404, towards the second plate portion 108. As indicated, forward movement of nut plate 200 may be a movement away from first end 111.

It must be noted that a movement of nut plate to positions where score line is beyond second plate portion 208 is possible. However, in order to provide sufficient support for a system that is mounted utilizing the mounting bracket system 302, nut plate 200 may not be moved beyond second position 400.

Figure 5:
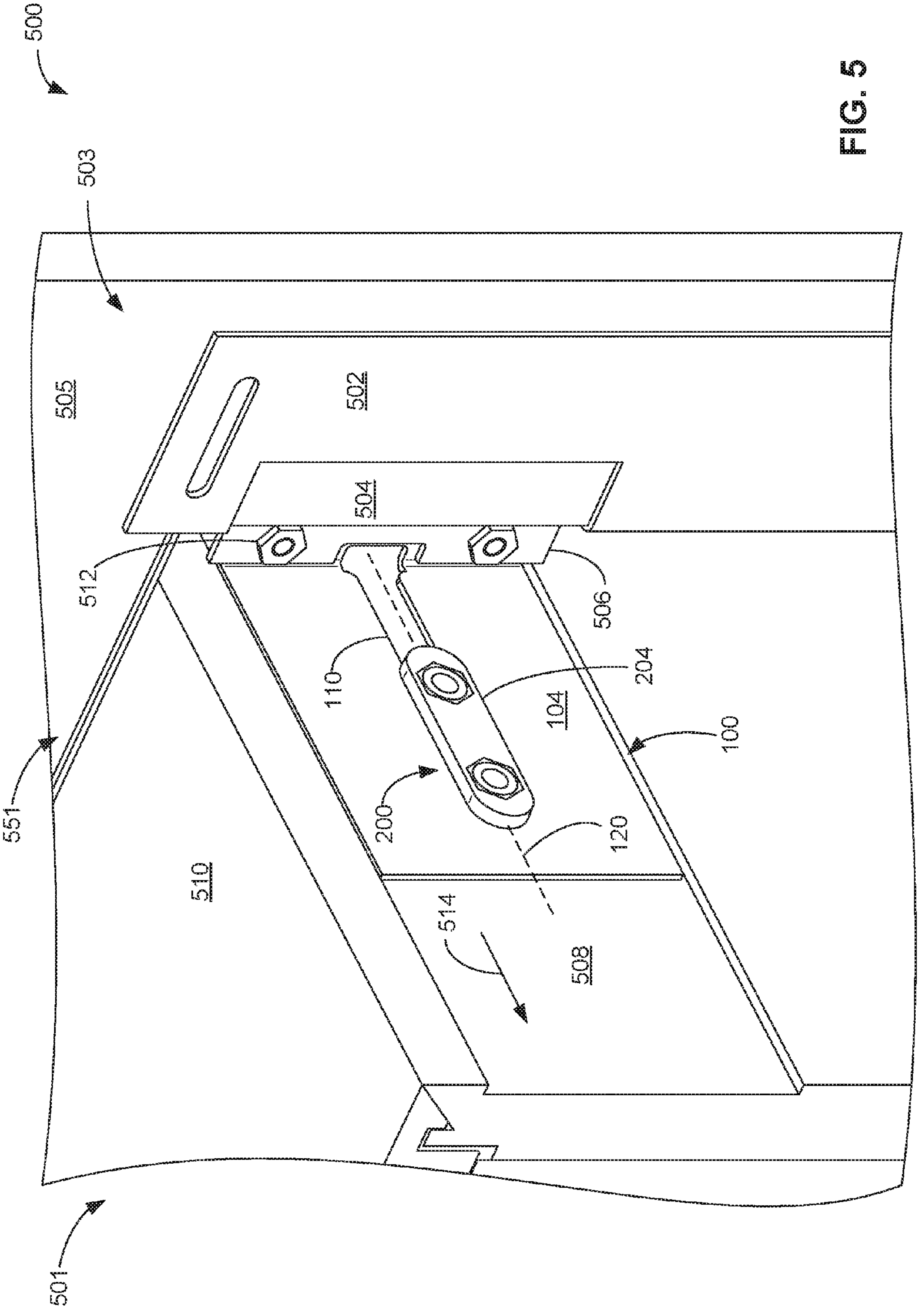
FIG. 5 shows a mounted in-wall system in a first position in accordance with one or more embodiments of the present disclosure.

FIG. 5 shows a partial perspective view of a mounted in-wall system 500 including an application system 501 mounted onto a wall system 503 by utilizing mounting bracket system 302. Wall system 503 may be included in a wall of a room 505. The wall may be a side wall that form sides of room 505 or a ceiling wall forming a ceiling of room 505. The perspective view of FIG. 5 is illustrated as viewed from behind wall system 503 and looking into room 505. In one embodiment, application system 501 may be an in-wall speaker system. In such cases, mounting bracket system 302 may be utilized to mount an in-wall speaker system on to wall system 503. It will be appreciated that mounting bracket system 302 may be utilized to mount any wall mounting application, such as flush-mount or in-wall thermostats, flush-mount paintings, flush-mount lighting applications, electricity meters, etc. Further, mounting bracket system 302 may be utilized to mount an in-ceiling application system, such as an in-ceiling speaker system. An example in-ceiling system including an in-ceiling application system mounted onto a ceiling wall by utilizing mounting bracket system 302 will be illustrates below with respect to FIGS. 11 and 12.

Wall system 503 may include a dry wall 504 coupled to a pre-construction bracket 502. Specifically, preconstruction bracket 502 may be coupled to one or more surfaces of dry wall 504 and may surround dry wall 504. As such, Preconstruction bracket may be made of a material different from a material utilized for forming drywalls. Preconstruction bracket 502 may include a tab 506 for attaching mounting bracket 100 to wall system 503. Mounting bracket 100 may be attached to tab 506 of preconstruction bracket 502 by means of bolts 512 and nuts (not shown). Specifically, slots 109 on second plate portion 108 of mounting bracket 100 may be aligned with a plurality of slots (not shown) included in tab 506, and nuts and bolts may be used to attach mounting bracket 100 to preconstruction bracket 502. That is, tab 506 of preconstruction bracket 502 and second plate portion 108 of mounting bracket 100 are attached via nuts inserted from a room side (side facing room 505) of preconstruction bracket 502 into the aligned slots of the tab and second plate portion, and secured by bolts on an opposite side (side opposite to room side) of preconstruction bracket 502. As shown, in order to attach a single mounting bracket 100 including two slots 109 to preconstruction bracket 502, two sets of bolts and nuts may be used. Further, tab 506 of the preconstruction bracket may not block a channel of slot 110 on the junction plate portion 106 and second plate portion 108. Thus, tab 506 may not restrict movement of nut plate beyond the junction plate portion 106 and second plate portion 108.

Application system 501 may include a housing 510 including a module (not shown) for performing a function intended by application system 501. For example, a module for an application system that comprises a speaker system may include a speaker driver or a transducer for performing one or more functions including sound reproduction and amplification. Further, housing 510 may be utilized for mounting application system 501 to wall system 503. Accordingly, housing 510 may include a plurality of holes (not shown) for receiving shafts 206 of nut plate 200 and a recess 508 for receiving mounting bracket 100. The plurality of holes may be provided within recess 508 on each of two side walls of housing 510, where the two side walls are perpendicular to a front side facing room 505. Further, based on a vertical length of housing 510, two or more recess, each including a plurality of holes for receiving shafts 206 may be included. In order to attach housing 510 to wall system 503, recess 508 may be aligned to make face-sharing contact with mounting bracket 100. After aligning, shafts 206 of nut plate 200 may be inserted into slot 110 of mounting bracket 100 and into plurality of holes (in this case, two holes) within the side wall of housing including the recess 508. After inserting shafts 206, a number of screws (not shown), wherein the number is based on a number of shafts 206 (the number of shafts being two in this example), may be utilized to couple housing 510 to mounting bracket 100 via nut plate 200. Specifically, screws may be internally threaded into shafts 206 from within housing. After coupling housing 510 to mounting bracket 100, the mounting bracket with the housing may be coupled to preconstruction bracket 502. In this way, housing 510 may be attached to wall system 503 via mounting bracket 100 and nut plate 200. As shown, a first surface of first plate portion 104 of mounting bracket 100 is in face sharing contact with a side surface of housing 510 within recess 508, and a portion of second opposite and parallel surface of first plate portion 104 has face sharing contact with a portion of base plate 204 of nut plate 200. Thus, mounting bracket 100 is sandwiched between housing 510 and nut plate 200.

After the screws are attached, housing 510 may be movable along with nut plate 200 through slot 110. That is, nut plate 200 and housing 510 are coupled and move together along longitudinal axis 120 of mounting bracket 100. Specifically, based on a tightness of attachment of screws to shafts 206, nut plate 200 along with housing 510 may be movable along longitudinal axis 120 via slot 110 while mounting bracket 100 remains stationary attached to preconstruction bracket 502. Therefore, in order to adjust housing 510 to a desired position, the tightness may be decreased. Recess 508 may provide a secondary channel in addition to slot 110 for movement of housing along axis 120 of mounting bracket 100. Thus, edges of recess 508 that is parallel to longitudinal axis 120 slide along longitudinal axis 120. In this way, housing 510 may be moved back and forth to adjust housing 510 to a desired position while remaining attached to wall system 503. After adjusting housing 510 to the desired position, the tightness of the screws threaded to shafts 206 may be increased until movement of nut plate 200 and housing 510 is restricted.

Because the base plate 204 can be loosened and tightened, and thus selectively enable the sliding motion based on a tightness of a member accessible from inside housing 510, it is relatively easy to adjust the positioning even with the housing installed in the wall, even without access to behind the wall area out outside of the housing 510, as such areas may be completely inaccessible in some examples.

FIG. 5 shows nut plate 200 coupled to housing 510 in a first position 551. First position 551 of nut plate 200 may be similar to first position 300 shown at FIG. 3. Thus, First position 551 shown at FIG. 5 is a full backward position. In order to move nut plate 200 and housing 510 to first position, nut plate 200 and/or housing 510 may be adjusted in a backward direction, indicated by arrow 514, towards a first end of slot 110, such as first end 111 indicated at FIGS. 1A-1D, 2A-2B, 3 and 4.

Figure 6:
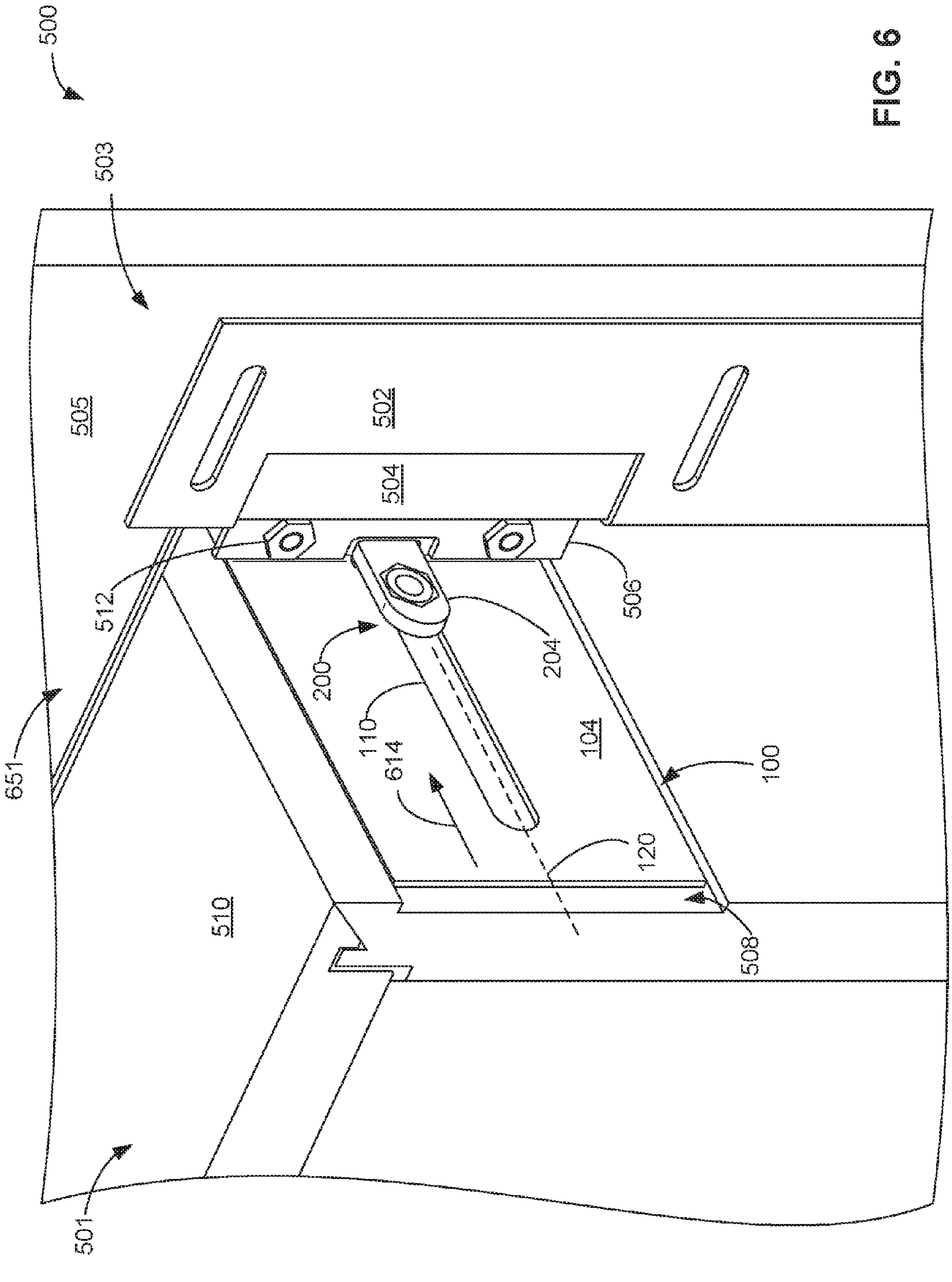
FIG. 6 shows the mounted in-wall system of FIG. 5 in a second position in accordance with one or more embodiments of the present disclosure.

FIG. 6 shows a partial perspective view of mounted in-wall system 500 including an application system 501 mounted onto wall system 503 in a second position 651. Specifically, nut plate 200 coupled to housing 510 in a second position 651. The second position of nut plate 200 may be similar to second position 400 shown at FIG. 4. Thus, the second position shown at FIG. 6 is a full forward position. In order to move nut plate 200 and housing 510 from the first position to the second position, nut plate and housing may be moved in a forward direction indicated by arrow 614. As discussed above, at the full forward position, the second shaft and a portion of base plate 204 including a curved edge of base plate facing room 505 are positioned beyond an outer surface of second plate portion 108. Wider channels of slot 110 in the junction plate portion 106 and second plate portion 108 allow nut plate 200 to travel beyond a transverse plane passing through the outer surface of second plate portion 108, which provides increased extension range for the mounted device. Thus, at the full forward position, a front surface of housing 510 may be positioned in front of dry wall 504 and/or any thick reflective or absorptive wall coverings. Thus, mounting bracket 100 and nut plate 200 may be utilized to position a device to a desired position with respect to the dry wall. In one example, the desired position may be a position where a front side of the housing is flush with dry wall. In another example, the desired position may be a position where the front side of the housing forms a frame around the dry wall. In still another example, the desired position may be wherein the front surface of the housing is slightly recessed from the drywall in order to allow a device covering, such as a baffle or a grill for a speaker device, that may be positioned over the front surface to be flush with the dry wall or clamp the drywall or slightly protrude from the dry wall. It must be appreciated that the mounting bracket 100 and nut plate 200 provide a mounting system that is capable of allowing adjustment of the housing in multiple positions including multiple positions in front of dry wall, flush with dry wall, and/or set back from dry wall.

In this way, by providing slot 110 that extends from a portion of first plate portion 104, folds along bent junction portion 106, and extends into second plate portion 108, and by configuring slot 110 such that width of slot in the junction portion 106 and second plate portion 108 allow movement of nut plate 200 through junction portion and second plate beyond a bent edge of mounting bracket 100, positioning of application system 501 with respect to dry wall or any wall covering in front of the drywall may be adjusted with greater flexibility. Further, the increased movability of the nut plate beyond the angled edge of the slot, also allows the in-wall mounting system described herein to be utilized to attach the application system to a framing structure of the wall, such as a stud, behind the dry-wall. For example, some devices may have heavy components. It may be desirable to couple such devices to the stud for increased support. By utilizing the in-wall mounting system described herein, heavier devices may be coupled to the stud and yet extend the device in front of the dry wall, thereby achieving increased support without comprising optimal positioning of the device.

Application system 501 may be positioned within an opening in a wall. In one example, the opening may be provided during construction. Wall system 503 may be provided on either side of the opening. Thus, housing 510 may be attached via mounting bracket system 302 to wall system 503 on both sides. In one embodiment, a first mounting bracket may be utilized to attach a first side of housing 510 to a first wall system adjacent to first side of housing 510, and a second mounting bracket may be utilized to attach a second parallel side of housing 510 to second wall system adjacent to the second side of housing 510. Other embodiments, where more than one mounting bracket is utilized for attaching the first side of the housing to the first wall system and where more than one mounting bracket is utilized for attaching the second side of the housing to the second wall system are also possible. An example where two mounting brackets are utilized for each side, thereby resulting in utilizing four mounting brackets for a housing is illustrated at FIGS. 7 and 8.

Figure 8:
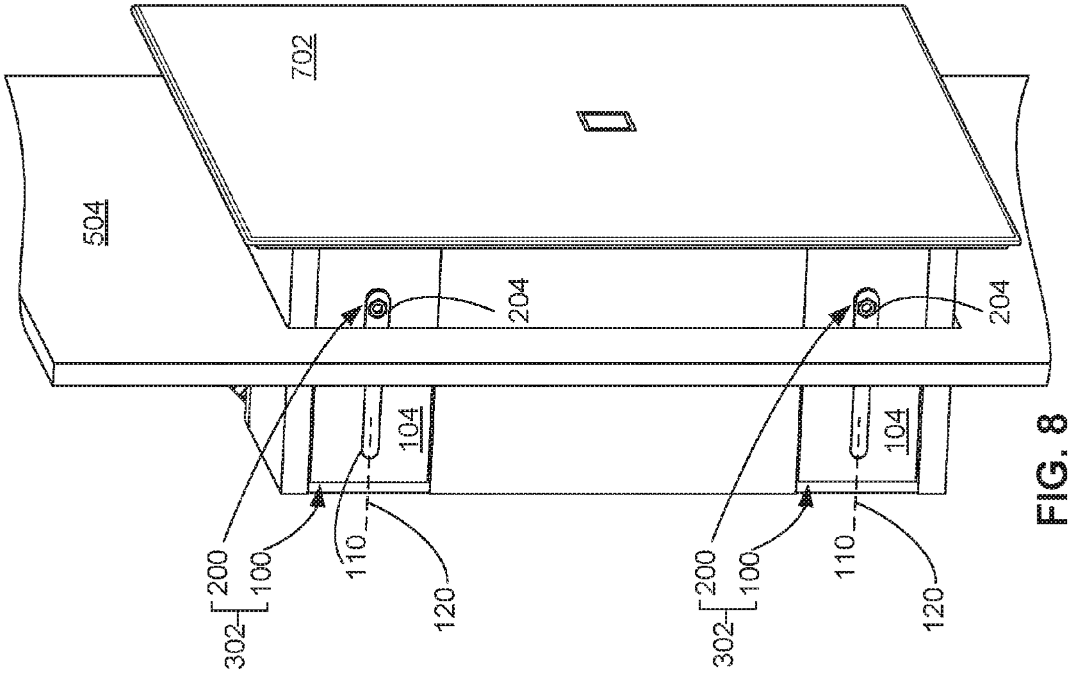
FIG. 8 shows a front perspective view of the mounted in-wall system of FIG. 5 in the second position in accordance with one or more embodiments of the present disclosure.
Figure 7:
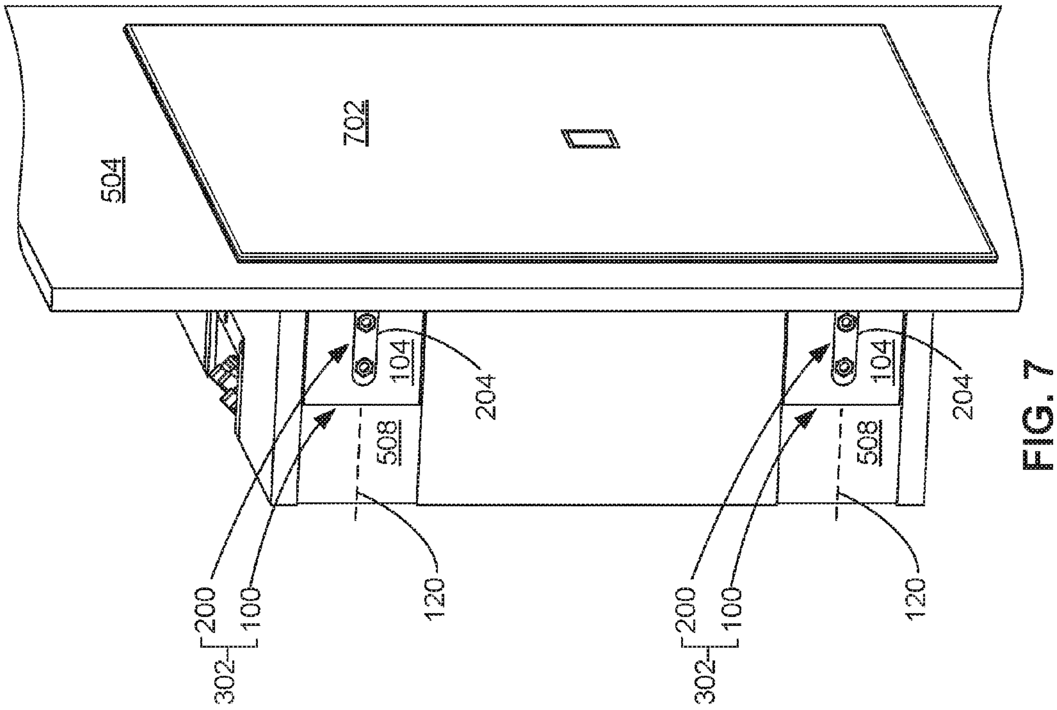
FIG. 7 shows a front perspective view of the mounted in-wall system of FIG. 5 in the first position in accordance with one or more embodiments of the present disclosure.

Referring to FIGS. 7 and 8, a front perspective view of housing 510 coupled to mounting bracket system 302 in first position 551 is shown at FIG. 7; and a front perspective view of housing 510 coupled to mounting bracket system 302 in second position 651 is shown at FIG. 8. Many of the elements of FIGS. 7 and 8 correspond to similarly numbered elements already described above for FIGS. 1A-6; such elements will not be described again for the sake of brevity. However, additional elements are discussed below. Specifically, FIGS. 7 and 8, show two mounting bracket systems 302 coupled to housing 510. Specifically, a first mounting bracket system may be attached to an upper portion of a side of housing 510 and a second mounting bracket system attached to a lower portion of the side of housing 510. Further, as shown, at first position 551, a front surface 702 of housing 510 is closer to dry wall 504 than when housing 510 and nut plate 200 are at second position 651. That is, at second position 651, housing 510 is displaced further in front of dry wall 504 towards room 505.

Figure 9:
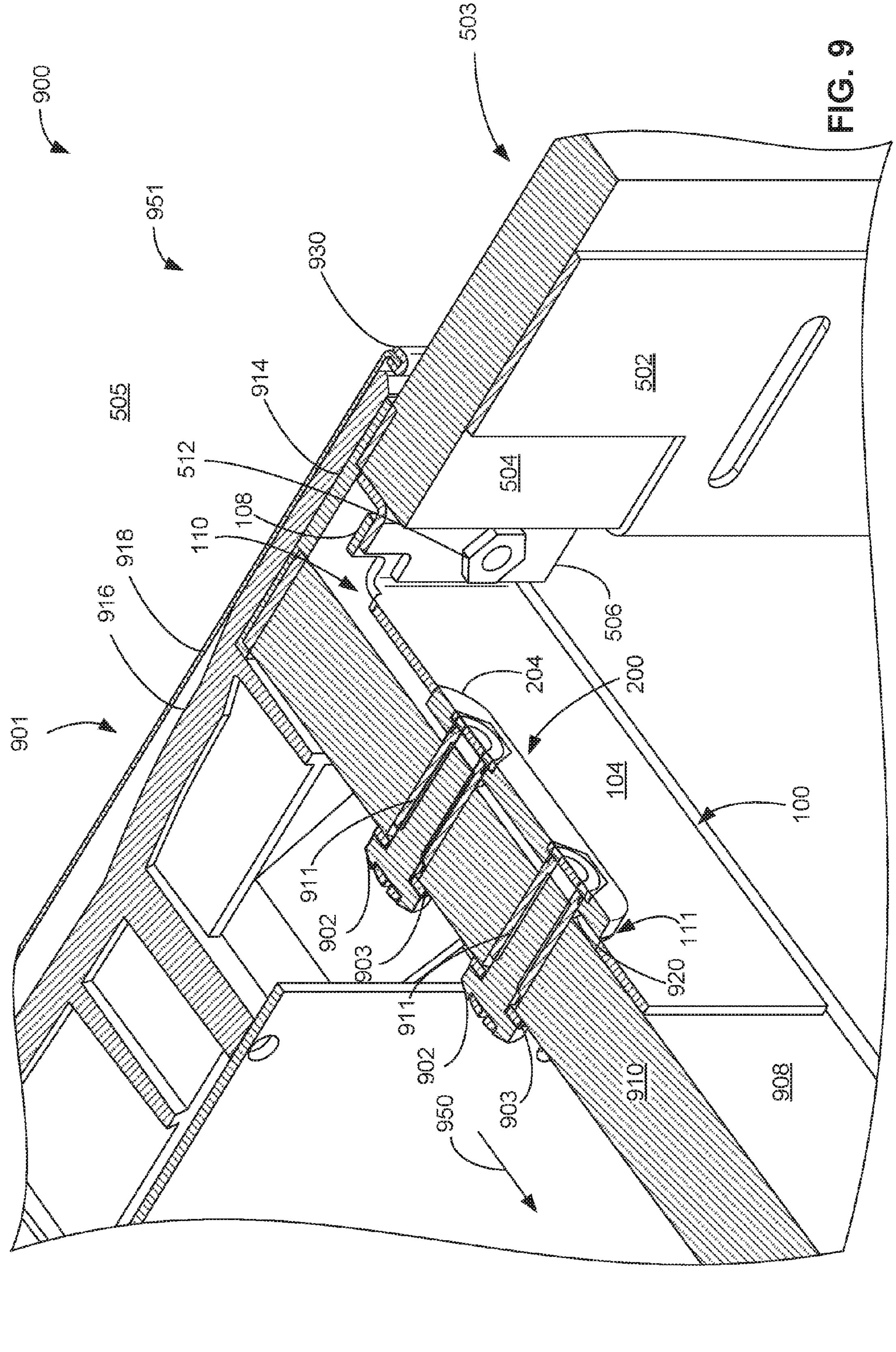
FIG. 9 shows another mounted in-wall system in a first position in accordance with one or more embodiments of the present disclosure.

Turning to FIG. 9, a partial sectional perspective view of a mounted speaker system 900 including an in-wall speaker system 901 mounted on wall system 503. Speaker system 901 may be an example of application system 501 at FIG. 5. In-wall speaker system 901 is shown in a first position 951. The first position 951 may be similar to first position 300 shown at FIG. 3. Thus, the first position 951 shown at FIG. 9 may be a full backward position. Many of the elements of FIG. 9 correspond to similarly numbered elements already described above for FIGS. 1-6; such elements will not be described again for the sake of brevity.

Speaker system 901 may include a housing 910 including a module, such as a speaker driver, for example. Housing 910 may be similar to housing 510 described above with respect to FIG. 5. Thus, speaker system may be coupled to wall system 503 via housing 910. housing 910 may be attached to wall system 503 via mounting bracket system 302 including mounting bracket 100 coupled to wall system 503 and nut plate 200. Specifically, shafts 206 may be inserted into holes 920 within a recess 908 of housing 910 and screws 902 may be threaded internally from inside of housing 910 to shafts 206 via internal threads 911. Further, it will be appreciated a clearance volume (not indicated) may be provided between shaft 206 and holes 920 into which shafts 206 are inserted. Further, a washer 903 may be placed around each hole 920 on an internal surface of wall of housing 910 prior to threading screws 902 into shafts 206. Thus, when screws 902 are threaded, washers 903 are sandwiched between a head portion of screws and the internal surface of wall of housing. As such, washers 903 may be utilized to reduce loosening of screws 902 by reducing unscrewing rotation of screws 902.

After coupling housing 910 to wall system 503 via mounting bracket system 302, position of speaker system 901 may be adjusted until a desired position is reached. In the example illustrated here at FIG. 9, the desired position may be first position 951, which is a full backward position. Therefore, at first position 951, base plate 204 of nut plate is in direct face sharing contact with an internal surface of first end 111 of the slot 110. Further, at first position 951, further backward movement (indicated by arrow 950) may be restricted by the internal surface of first end 111. After achieving the desired position, screws may be tightened to restrict further forward or backward movement of the mounted application system.

Speaker system 901 may include a baffle 916 that may be mounted in front of housing 910. That is, baffle 916 may be mounted over a front surface, such as surface 702 at FIG. 7, of housing 910 that is facing room 505 and perpendicular to sides utilized for coupling with mounting bracket system. Further, baffle 916 may also extend across from the front surface of the housing to a surface of dry wall 504 facing room 505 or a surface any wall covering in front of the dry wall facing room 505. Further, a compressible gasket 914 may be included in between the baffle 916 and the surfaces of housing 910 and dry wall 504 for preventing damage to the surfaces of housing 910, dry wall 504, and baffle 916. In this example, gasket 914 is shown partly compressed at the first position 951. Further, a grill 918 may be mounted in front of the baffle towards room 505. Grill 918 may include a grill trim 930 that may form a frame around the grill. In one example, grill 918 may be a magnetic grill and trim 930 may be a vinyl grill trim.

Figure 10:
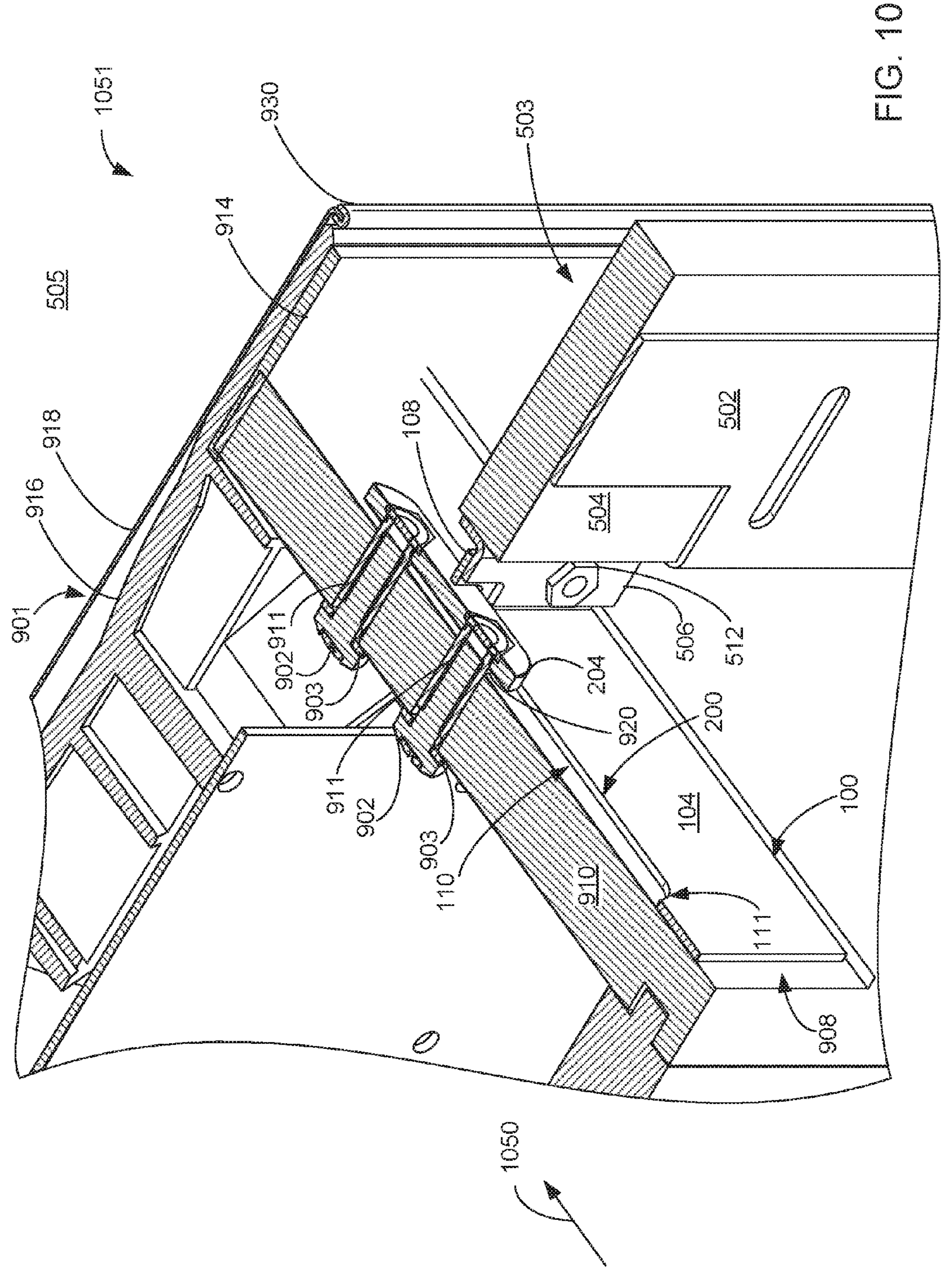
FIG. 10 shows the mounted in-wall system of FIG. 9 in a second position in accordance with one or more embodiments of the present disclosure.

FIG. 10 shows a partial sectional perspective view of mounted speaker system 900 including in-wall speaker system 901 mounted on wall system 503 in a second position 1051. Many of the elements of FIG. 10 correspond to similarly numbered elements already described above for FIGS. 1A-9; such elements will not be described again for the sake of brevity. The second position 1051 may be similar to second position 400 shown at FIG. 4. Thus, the second position 1051 may be a full forward position.

A direction of displacement of housing 910 along longitudinal axis 120 from first position 951 to second position 1051 is indicated at arrow 1050. That is, arrow 1050 indicates direction of forward movement of housing 910. Housing 910 may be adjusted to second position by adjusting movement of nut plate 200 and/or housing 910 along longitudinal axis 120. As nut plate 200 is coupled to housing 910, nut plate 200 and housing 910 may be adjusted together. Nut plate 200 may travel along opening or channel in slot 110 and as housing 910 is coupled to nut plate 200 (via screws 920 and shafts 206), housing 910 may move along with nut plate 200. As a width of slot 110 is greater towards the junction plate portion 106 on first plate portion, at the junction plate portion 106 and at the second plate portion 108 than the remaining portions of slot 110 on the first plate 104, nut plate 200 is movable beyond the junction plate portion 106 and second plate portion 108. That is, nut plate 200 is movable beyond an outer surface (outer surface towards room 505) of mounting bracket that is at a right angle with respect to first plate portion 104. It must be noted that the width of the wider portion of slot 110 is based on a width of base plate portion. Specifically, width of the wider portion of slot 110 may be greater than width of base plate portion so as to allow the base plate to move through the wider portion of slot 110. Thus, at second position, housing 910 is positioned further into room 505 and away from dry wall 504 compared to first positions. Said another way, distance between a surface of gasket 914 facing dry wall 504 and a surface of dry wall 504 facing gasket 914 is greater at second position 1051 than at first position 951. In this example, gasket 914 is shown uncompressed at the second position 1051.

Figure 11:
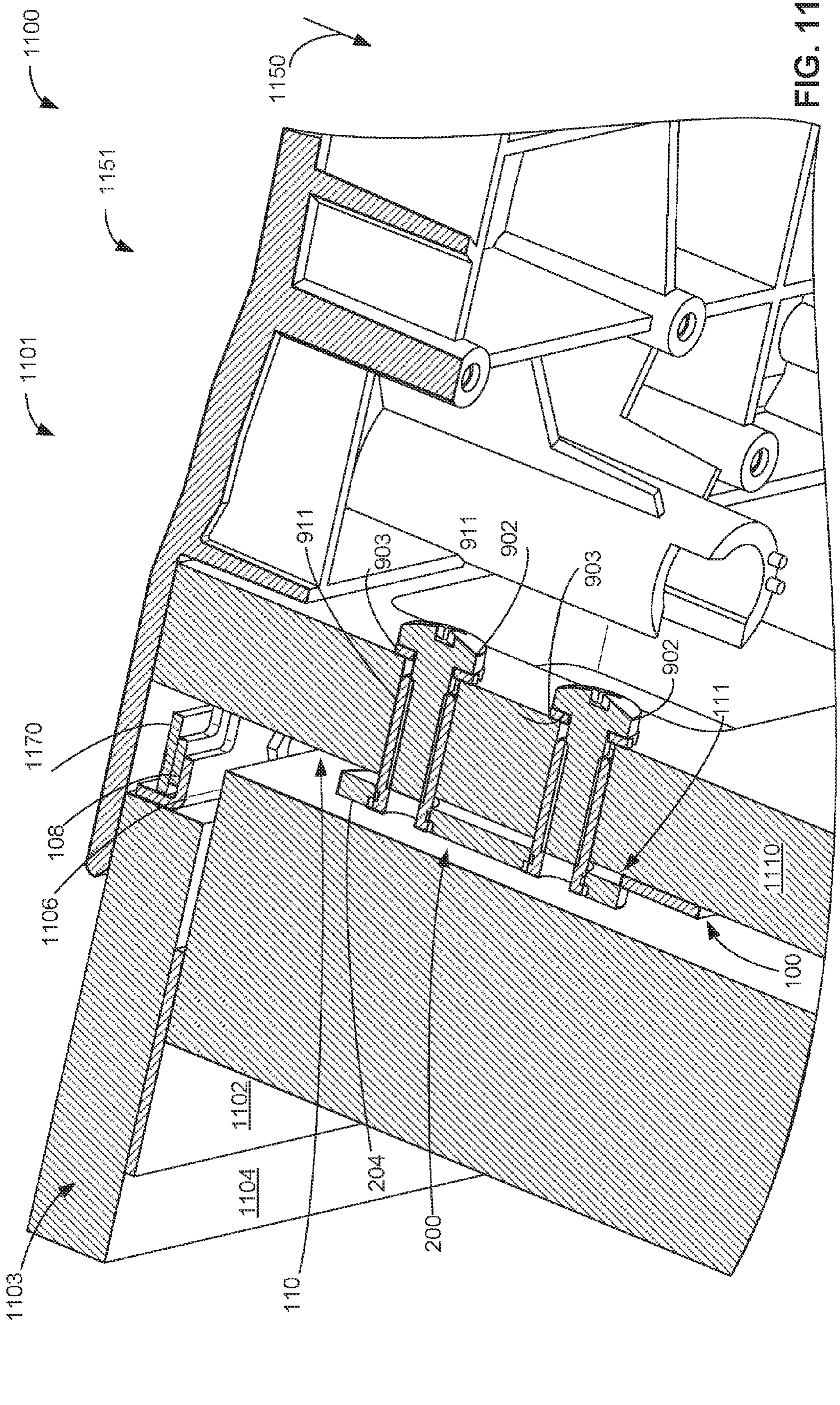
FIG. 11 shows another mounted in-wall system in a first position in accordance with one or more embodiments of the present disclosure.

FIG. 11 shows a partial sectional perspective view of a mounted speaker system 1100 including another example speaker system 1101 mounted on wall system 1103. Speaker system 1101 is shown in a first position 1151. The first position 1151 may be similar to first position 300 shown at FIG. 3. Thus, the first position 1151 may be a full backward position. In the first position, a backward movement, indicated by arrow 1150, may be restricted by slot 110, and a first shaft of nut plate 200 is in face sharing contact with an inner surface of a first end 111 of slot 110. Many of the elements of FIG. 11 correspond to similarly numbered elements already described above for FIGS. 1-10; such elements will not be described again for the sake of brevity.

Speaker system 1101 may be an example of application system 501 at FIG. 5. Specifically, speaker system 1101 may be an in-ceiling speaker system and may be attached to a ceiling wall, for example. Thus, wall system 1103 may be a ceiling wall system. However, components of wall system 1103, such as dry wall 1104 and preconstruction bracket 1102 may be similar to respective components of wall system 503, such as dry wall 504 and preconstruction bracket 502 described at FIG. 5. Thus, the arrangement and function of wall system 1103 may be similar to arrangement and function of wall system 503. Hence, wall system 1103 will not be described in detail for the sake of brevity. However a brief description and further description of additional components are provided below.

Wall system 1103 may include a dry wall 1104 coupled to pre-construction bracket 1102. Preconstruction bracket 1102 may include a tab 1106 for attaching mounting bracket 100 to wall system 1103. Specifically, second plate portion 108 of mounting bracket 100 may be coupled to tab 1106 of preconstruction bracket 1102 by means of bolts and nuts (not shown).

Speaker system 1101 may include a housing 1110 including a module, such as a speaker driver, for example. Housing 1110 may be similar to housing 510 described above with respect to FIG. 5. Thus, speaker system may be coupled to wall system 1103 via housing 1110. As discussed above, housing 1110 may be attached to wall system 1103 via mounting bracket system 302 including mounting bracket 100 coupled to wall system 1103 and nut plate 200.

Figure 12:
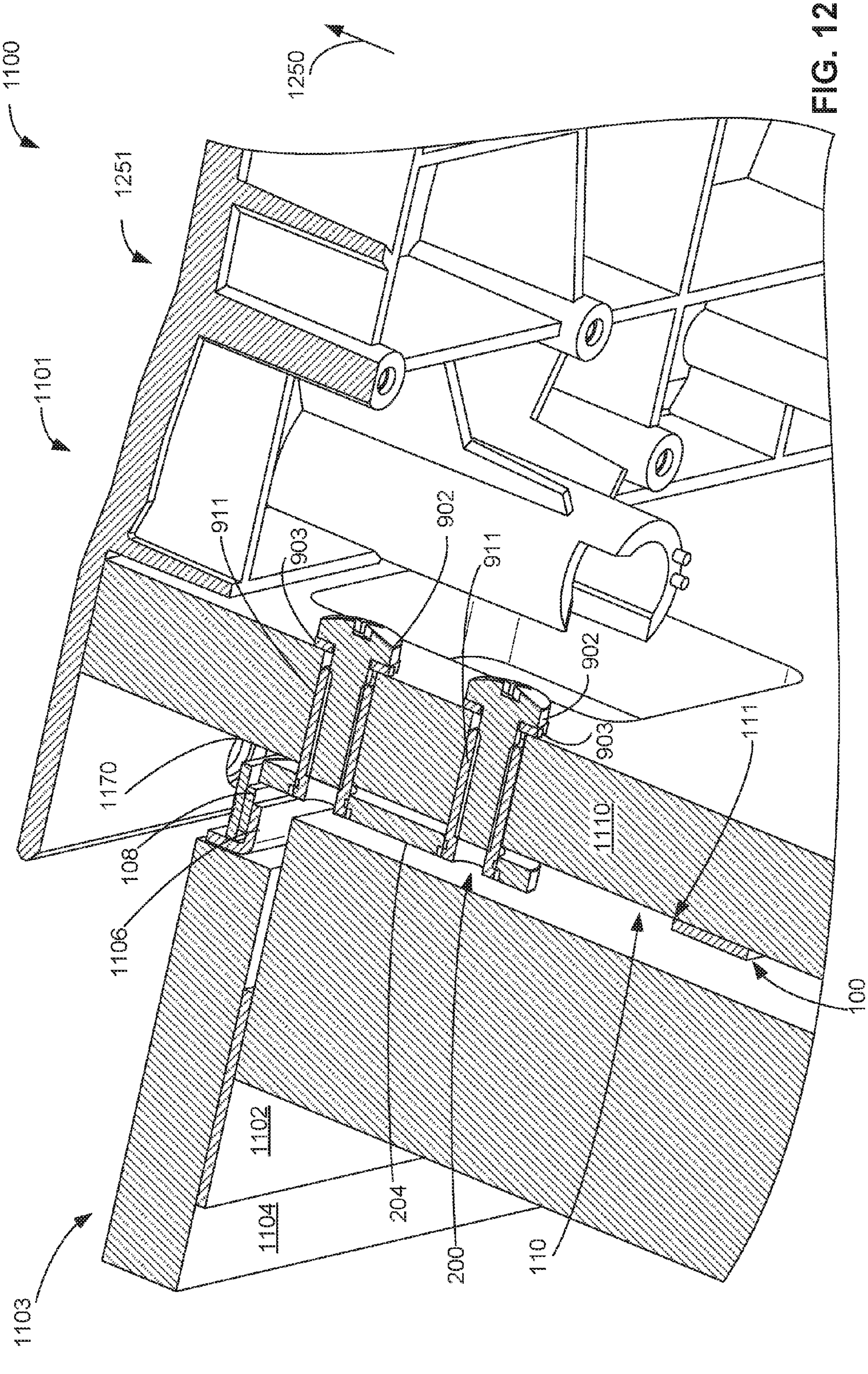
FIG. 12 shows the mounted in-wall system of FIG. 11 in a second position in accordance with one or more embodiments of the present disclosure.
Figure 13:
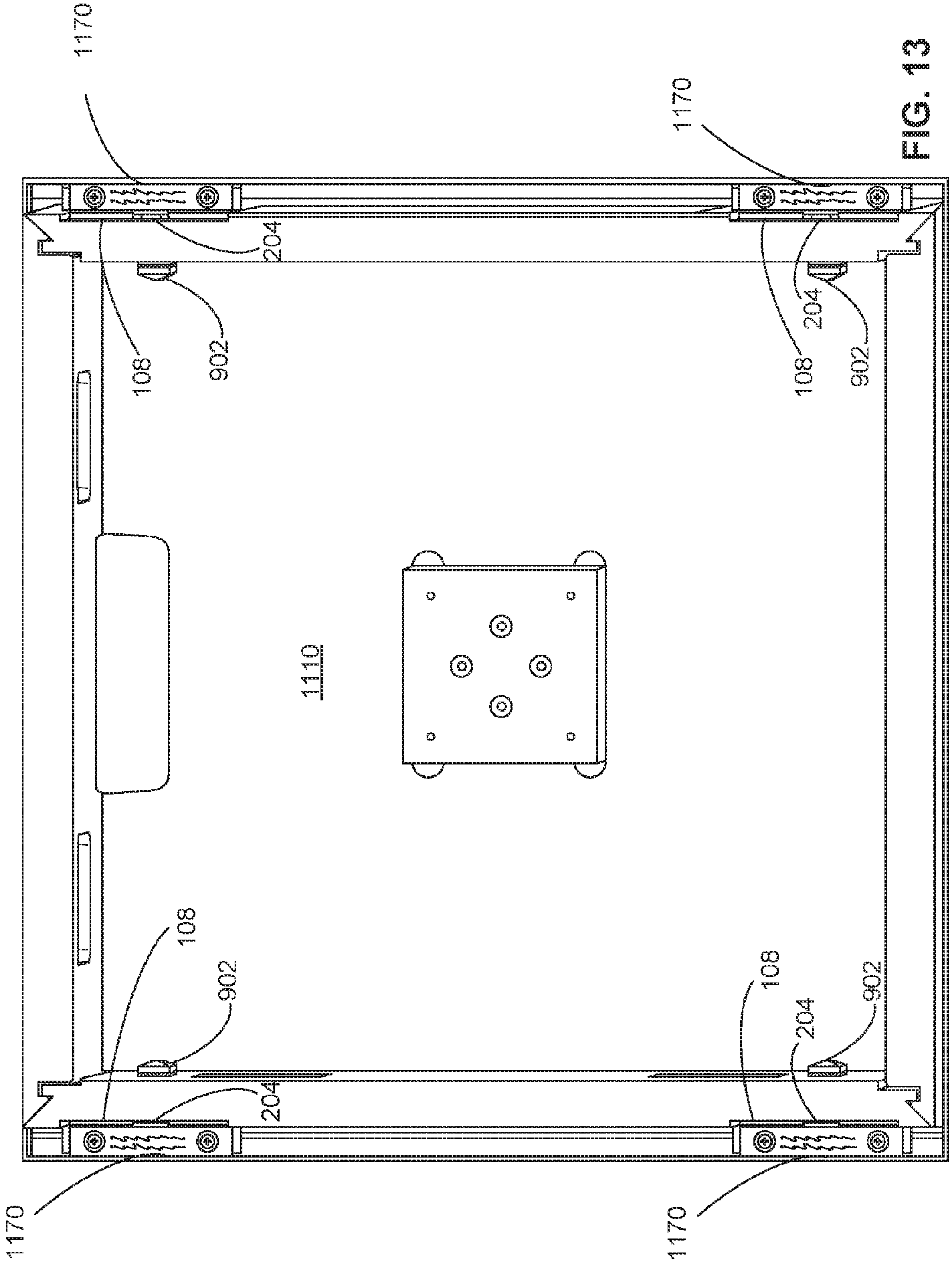
FIG. 13 shows a front view of another mounted in-wall system in accordance with one or more embodiments of the present disclosure.

Further, prior to coupling second plate portion 108 to tab 1106 with nuts and bolts, a security plate 1170 may be positioned on an outer surface opposite to surface facing tab 1106. Security plate 1170 may be a rectangular plate and may block a channel or opening of slot 110 on second plate portion 108 and a portion of channel of slot 110 on junction plate portion 106 such that nut plate 200 may not move through the wider portion of slot 110 and beyond the perimeter of mounting bracket. Thus, for in-ceiling applications, second plate portion 108 and security plate 1170 may be attached to pre-construction bracket 1102. Specifically, security plate 1170 may be positioned in front of second plate portion 108, and second plate portion 108 may be positioned in front of the pre-construction bracket 1102 (towards the room side). Security plate 1170, second plate portion 108, and pre-construction bracket 1102 may be coupled together. The coupling may be performed via nuts and bolts, for example. In this way, security plate 1170 may be utilized for restricting a movement of nut plate 200 in in-ceiling applications. A front view of speaker system 1101 mounted on wall system 1103 with security plates 1170 is shown at FIG. 13. Many of the elements of FIG. 13 correspond to similarly numbered elements already described above for FIGS. 1-12; such elements will not be described again for the sake of brevity.

While FIG. 11 shows speaker system 1101 mounted on wall system 1103 in the first position 1151; FIG. 12 illustrates a third position 1251 of speaker system 1101 mounted on wall system 1103. Many of the elements of FIG. 12 correspond to similarly numbered elements already described above for FIGS. 1-11; such elements will not be described again for the sake of brevity.

In the third position, a front portion of nut plate 200 (semi-circular portion that is closer to the second shaft of shafts 206) is in face-sharing contact with security plate 1170, and a movement of nut plate is restricted by security plate 1170. Thus, nut plate 200 and hence, housing 1110 coupled to nut plate 200 may not be movable in a forward direction indicated by arrow 1250 from third position 1251. If the security plate 1170 is not installed, the nut plate may be further movable in the forward direction 1250 from the third position to a second position, such as second position 1051 shown at FIG. 10.

Figure 14:
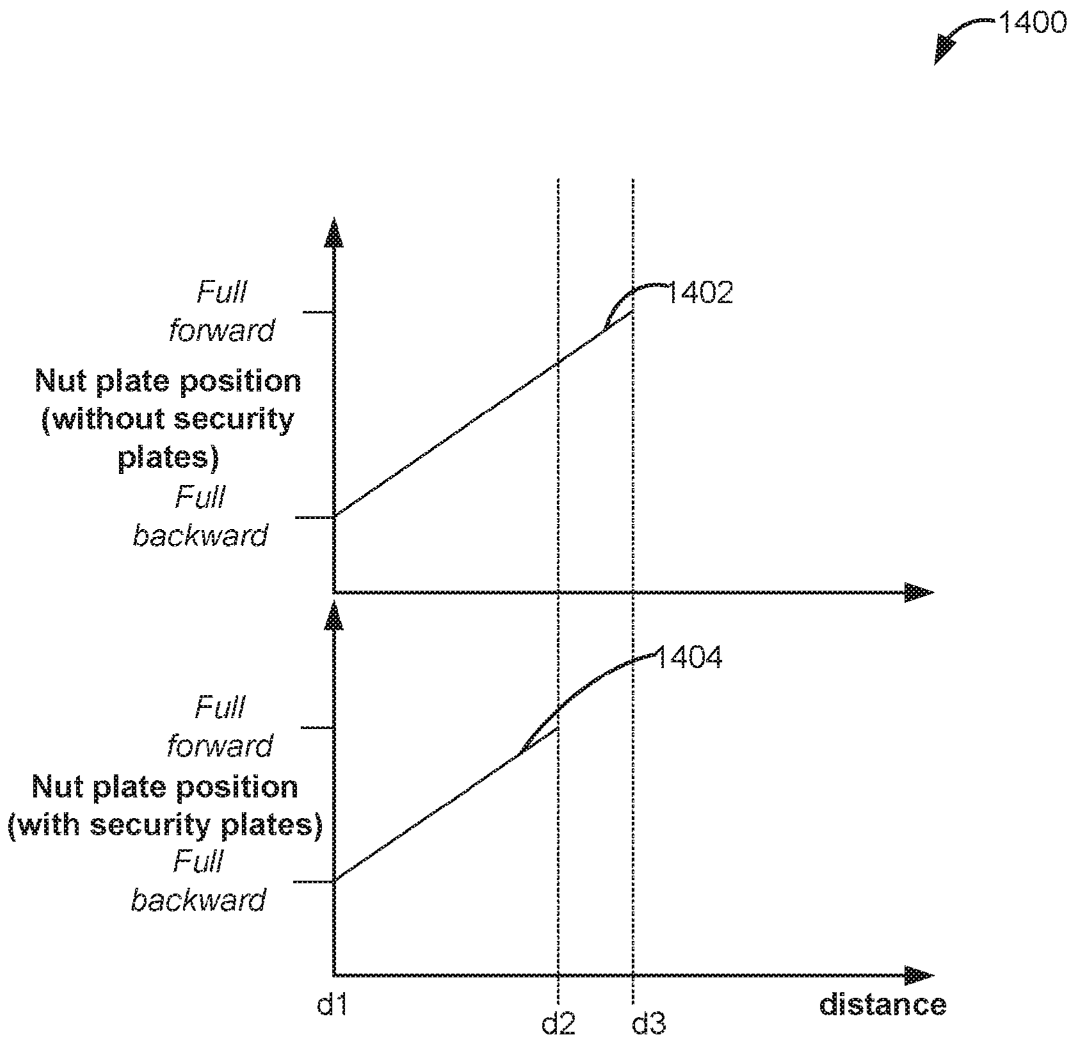
FIG. 14 shows an example positioning of a nut plate with respect to distance travelled by the nut plate in accordance with one or more embodiments of the present disclosure.

Example graphs illustrating a position of nut plate, such as nut plate 200 and distance travelled by the nut plate in the presence and absence of security plate is shown at FIG. 14.

Specifically, first plot from top of FIG. 14 indicates position of nut plate included in a system without security plates, such as system 900 shown at FIGS. 9 and 10, versus distance travelled from a first position. The first position may be similar to first position 300 indicated at FIG. 3 or first position 951 indicated at FIG. 9, and hence, first position may be a full backward position and the nut plate may not move backwards from the first position. Position of nut plate is shown along Y-axis and nut plate travels from first position in a forward direction to a second position along the direction of Y axis arrow. Second position may be similar to second position 400 indicated at FIG. 4 or second position 1051 indicated at FIG. 10, and accordingly, second position may be a full forward position when security plates are not installed. Trace 1402 indicates change in position with respect to distance.

Second plot from top of FIG. 14 indicates position of nut plate included in a system with security plates, such as system 1100 at FIGS. 11 and 12, versus distance travelled from a first position, the first position being a full backward position similar to first position 300 indicated at FIG. 3 or first position 1151 indicated at FIG. 11. Position of nut plate is shown along Y-axis and nut plate travels from first position in a forward direction to a third position along the direction of Y axis arrow. Third position may be similar to third position 1251 indicated at FIG. 12, and hence, third position may be a full forward position when security plates are installed. Trace 1404 indicates change in position with respect to distance.

As shown, d1 may indicate a starting point when the nut plate is in full backward position or first position. In the absence of the security plate, the nut plate may travel through a slot, such as slot 110 at FIGS. 1-12, and a user may terminate further movement beyond the second position, the second position indicated by a score line on the nut plate. Thus at d3, the nut plate may have reached an end point d3, and a first distance travelled by the nut plate in the absence of security plate is d3−d1. However, in the presence of nut plate, movement of nut plate beyond a boundary of mounting bracket is restricted by the security plate, thus nut plate may not move forward beyond the third position indicated at point d2. A second distance travelled by the nut plate in the presence of security plate is d2−d1. As illustrated, distance (d3−d1) travelled by nut plate from a full back ward position to a full forward position when security plates are not installed is greater than a distance (d2−d1) travelled from a full back ward position to a full forward position when security plates are installed.

Figure 15:
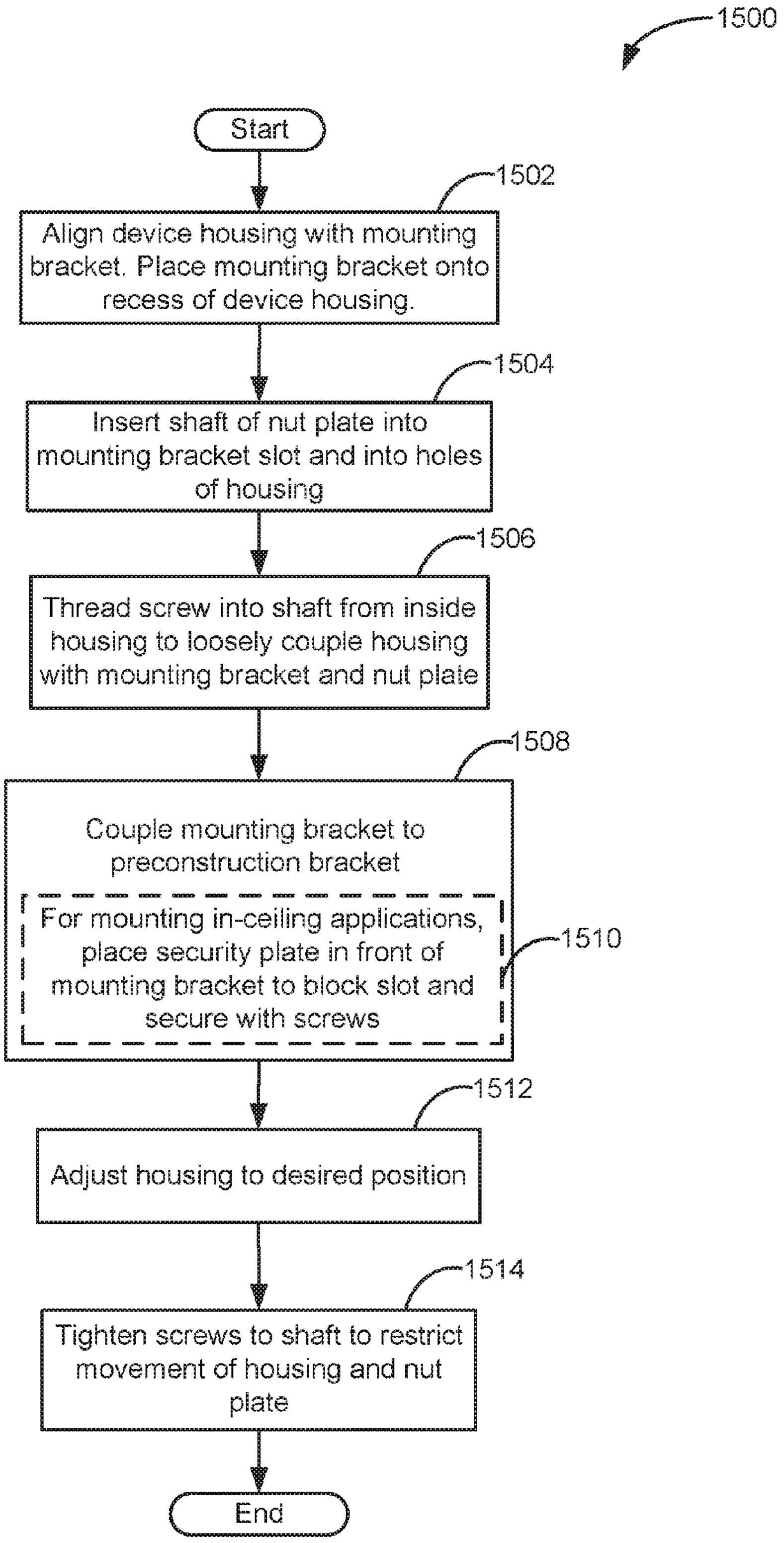
FIG. 15 shows an example method for mounting a device to a wall in accordance with one or more embodiments of the present disclosure.

Turning to FIG. 15, an example method 1500 for mounting an application system, such as application system 501 shown at FIG. 5, onto a wall system, such a wall system 503 at FIG. 5, is illustrated. Method may be performed manually by a user, for example.

Method begins at 1502. At 1502, method 1500 includes aligning a housing, such as housing 510 at FIG. 5, including a module for the application system, with a mounting bracket, such as mounting bracket 100 at FIG. 1. Specifically, the housing may include a plurality of recess, such as recess 508 at FIG. 5, on outer surfaces of two sides of the housing, each side parallel to each other and to a longitudinal axis, such as axis 120 at FIG. 1, of the mounting bracket. The mounting bracket may be placed onto the recess of the device housing. Further, within the recessed portion, a plurality of holes for receiving one or more shafts, such as shafts 206 at FIG. 2, of a nut plate, such as nut plate 200 at FIG. 2, may be included.

After aligning the recess portion of the housing with the mounting bracket, method 1500 proceeds to 1504. At 1504, method 1500 includes inserting the shafts of the nut plate into the holes of the housing via a mounting bracket slot, such as slot 110 at FIG. 1A.

After inserting the shafts, method 1500 proceeds to 1506. At 1506, one or more screws may be internally threaded into shafts from inside the housing, thereby coupling the housing with the mounting bracket via the nut plate and screws. Initially, prior to coupling the mounting bracket to the preconstruction bracket, the housing may be loosely coupled to the mounting bracket with screws in order to allow desired positioning of the device housing.

After coupling the housing with the mounting bracket, method 1500 proceeds to 1508. At 1508, method 1500 includes coupling the mounting bracket loosely coupled to the device housing, to a preconstruction bracket, such as preconstruction brackets 502 or 1102. Preconstruction bracket may include a tab, such as tab 506 or 1106, to which mounting bracket may be coupled. The coupling may be via nuts and bolts, for example. Further, the coupling between the preconstruction bracket and the mounting bracket may be tight to secure the mounting racket to the preconstruction bracket. In some examples, when application system is mounted onto a ceiling system, method 1500 additionally includes step 1510. At 1510, one or more security plates, such as security plates 1170, may be attached to one or more mounting brackets to block a channel or an opening of the mounting bracket slot on the mounting bracket. As such, one security plate may be used for each mounting bracket. The security plate may be coupled to the mounting bracket by placing the security plate in front of the mounting bracket and securing the security plate to the mounting bracket with screws. Specifically, mounting bracket with the device housing may be positioned such that a second plate portion, such as second plate portion 108 shown at FIG. 1A, of the mounting bracket is in front of the pre-construction bracket, and the security plate is in front of the second plate portion of the mounting bracket (towards a room side). The preconstruction bracket, the second plate portion of the mounting bracket and the security plates are then coupled by screws.

Next, after attaching the mounting bracket (coupled with the housing) to the preconstruction bracket or after attaching the security plates and the mounting bracket (coupled with the housing) to the preconstruction bracket, method 1500 proceeds to 1512. At 1512, the method includes adjusting the housing to a desired position by moving the housing along with the nut plate through the slot along the longitudinal axis of the mounting bracket. The desired position may be based on a position and thickness of the drywall and if additional wall covering are installed. In one example, the nut plate and the housing may be adjusted to a full forward position. When security plates are not included, adjusting to the full forward position may include moving the nut plate and housing together coupled in a forward direction via the master bracket slot, towards a room including the wall system, and beyond a perimeter or beyond an outer surface of a portion of the mounting bracket that is coupled to the preconstruction bracket. However, when security plates are included, the slot 110 is blocked by the plates and at the full forward position; the nut plate may not travel beyond the perimeter of the mounting bracket. In another example, the nut plate and the housing may be adjusted to a full backward position at which position, a shaft of the nut plate comes in contact with an first semi-circular end portion of the slot on the mounting bracket. As a result, the nut plate may not move further backwards (away from the room). It will be appreciated that the nut plate and the housing may be adjusted to any position between the full forward and the full backward positions.

Next, after adjusting to the desired position, at 1514, the one or more screws that are internally threaded from the inside of the housing to the shafts and loosely coupling the housing to the mounting bracket via the shafts, may be tightened to further restrict any movement of the nut plate and housing.

In some examples, after tightening the screws, one or more additional components of the application system may be installed onto the front surface of the housing. For example, for an in-wall speaker system, a baffle and a grill may be mounted on the front surface of the housing. In this way, the mounting bracket system including the mounting bracket and the nut plate may be utilized to mount an application system on a side wall or a ceiling wall.

The systems and methods described above also provide for a mounting bracket including a first plate portion; a second plate portion, the second plate portion positioned at an angle with respect to the first plate; and a slot extending continuously from the first plate portion to the second plate portion. In a first example of the mounting bracket, a first end of the slot on the first plate portion is curved, and a second end of the slot on the second plate portion is flat. A second example of the mounting bracket optionally includes the first example and further includes wherein a first width of a first slot portion of the slot on the first plate portion is less than a second width of a second slot portion of the slot on the first plate portion, and where the slot extends only partially through each of the first and second plate portions in a single, continuously uninterrupted and straight path. A third example of the mounting bracket optionally includes one or more of the first and the second examples and further includes wherein the first slot portion has a length greater than the second slot portion. A fourth example of the mounting bracket optionally includes one or more of the first through the third examples, and further includes wherein a third slot portion of the slot on the second plate portion has the second width. A fifth example of the mounting bracket optionally includes one or more of the first through the fourth examples and further includes wherein the slot is positioned centrally along a longitudinal axis of the first plate portion; wherein the angle is a right angle; and wherein the first plate portion has a greater surface area than the second plate portion. A sixth example of the mounting bracket optionally includes one or more of the first through the fifth examples and further includes wherein second plate portion is coupled to a support structure by a plurality of nuts and bolts; and wherein a housing for a device is coupled to first plate portion via internally threading a plurality of shafts of a nut plate inserted into the slot and into the housing with a plurality of screws. A seventh example of the mounting bracket optionally includes one or more of the first through the sixth examples and further includes wherein the support structure is a dry wall; and wherein the device is a speaker.

The system and methods described above also provide for a mounting bracket system, including an angled plate including a slot having a first end on a first portion of the angled plate and a second end on a second portion perpendicular to the first portion; and a nut plate including a base plate and a plurality of shafts perpendicular to the base plate; wherein, the nut plate is linearly movable within the slot and along a longitudinal axis of the angled plate. In a first example of the system, the slot extends continuously from the first end to the second end. A second example of the system optionally includes the first example and further includes wherein the slot has a first width for a first slot portion on the first portion and a second width for a second slot portion on the first portion, the first slot portion having a length greater than the second slot portion and the first width less than the second width. A third example of the system optionally includes one or more of the first and the second examples and further includes wherein the second width is based on a third width of the base plate, the system further coupled to a speaker housing and to a wall of a room of a building. A fourth example of the system optionally includes one or more of the first through the third examples, and further includes wherein a third slot portion of the slot on the second portion has the second width. A fifth example of the system optionally includes one or more of the first through the fourth examples and further includes wherein a length of the third slot portion is based on a thickness of the base plate. A sixth example of the mounting bracket optionally includes one or more of the first through the fifth examples and further includes wherein each of the plurality of shafts is hollow and includes internal threads for receiving a screw. A seventh example of the system optionally includes one or more of the first through the sixth examples and further includes wherein the nut plate is movable beyond the second portion via the third slot portion. An eighth example of the system optionally includes one or more of the first through the seventh examples and further includes wherein the plurality of shafts are inserted into the slot such that the shafts extend outward through the slot in a diametrically opposite direction with respect to second portion.

The systems and methods described above also provide for a mounting system including a mounting bracket including a slot extending from a first portion of the bracket into a second perpendicular portion of the bracket, the second portion coupled to a preconstruction construction bracket coupled to a dry wall; a nut plate including a base plate perpendicular to a plurality of shafts with internal threads, the plurality of shafts inserted into the slot in the first portion and into a plurality of holes within a side wall of a housing including speaker; a plurality of screws coupling the housing to the bracket via the plurality of shafts; and the housing mounted flush to the dry wall via the bracket and nut plate. A second example of the system optionally includes the first example and further includes wherein the nut plate and the housing are movable together along the slot in the first portion along a longitudinal axis of the bracket, the system further comprising a baffle mounted over a front wall of the housing, the front wall perpendicular to the side wall and facing a room including the dry wall; a grill including a grill trim mounted in front of the baffle towards the room; and a compressible gasket between the baffle and the housing. A third example of the system optionally includes one or more of the first and the second examples and further includes wherein a first width of the slot in the first portion is less than a second width of the slot in the second portion.

Although the invention has been illustrated and described with respect to several preferred embodiments thereof, various changes, omissions and additions to the form and detail thereof, may be made therein, without departing from the spirit and scope of the invention. The description of embodiments has been presented for purposes of illustration and description. Suitable modifications and variations to the embodiments may be performed in light of the above description or may be acquired from practicing the methods. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A mounting bracket, comprising:

a first plate portion;

a second plate portion, the second plate portion positioned at an angle with respect to the first plate portion; and a slot extending continuously from the first plate portion to the second plate portion;

wherein the second plate portion is coupled to a support structure by a plurality of nuts and bolts, and wherein a housing for a device is coupled to the first plate portion via internally threading a plurality of shafts of a nut plate inserted into the slot and into the housing with a plurality of screws.

2. The mounting bracket of claim 1, wherein a first end of the slot on the first plate portion is curved, and a second end of the slot on the second plate portion is flat.

3. The mounting bracket of claim 1, wherein a first width of a first slot portion of the slot on the first plate portion is less than a second width of a second slot portion of the slot on the first plate portion.

4. The mounting bracket of claim 3, wherein the first slot portion has a length greater than the second slot portion, and where the slot extends only partially through each of the first and second plate portions in a single, continuously uninterrupted and straight path.

5. The mounting bracket of claim 4, wherein a third slot portion of the slot on the second plate portion has the second width.

6. The mounting bracket of claim 1, wherein the slot is positioned centrally along a longitudinal axis of the first plate portion, wherein the angle is a right angle, and wherein the first plate portion has a greater surface area than the second plate portion.

7. The mounting bracket of claim 1, wherein the support structure is a dry wall, and wherein the device is a speaker.

8. A mounting bracket system, comprising:

an angled plate including a slot having a first end on a first portion of the angled plate and a second end on a second portion of the angled plate perpendicular to the first portion; and a nut plate including a base plate and a plurality of shafts perpendicular to the base plate;

wherein the nut plate is linearly movable within the slot and along a longitudinal axis of the angled plate, and wherein each of the plurality of shafts is hollow and includes internal threads for receiving a screw.

9. The system of claim 8, wherein the slot extends continuously from the first end to the second end.

10. The system of claim 8, wherein the slot has a first width for a first slot portion on the first portion and a second width for a second slot portion on the first portion, the first slot portion having a length greater than the second slot portion, and wherein the first width is less than the second width.

11. The system of claim 10, wherein the second width is based on a third width of the base plate, the system further coupled to a speaker housing and to a wall of a room of a building.

12. The system of claim 10, wherein a third slot portion of the slot on the second portion has the second width.

13. The system of claim 12, wherein a length of the third slot portion is based on a thickness of the base plate.

14. The system of claim 12, wherein the nut plate is movable beyond the second portion via the third slot portion.

15. The system of claim 8, wherein the plurality of shafts is inserted into the slot such that the shafts extend outward through the slot in a diametrically opposite direction with respect to the second portion.

16. A system, comprising:

a mounting bracket including a slot extending from a first portion of the mounting bracket into a second perpendicular portion of the mounting bracket, the second portion coupled to a preconstruction construction bracket coupled to a dry wall;

a nut plate including a base plate perpendicular to a plurality of shafts with internal threads, the plurality of shafts inserted into the slot in the first portion and into a plurality of holes within a side wall of a housing including a speaker; and a plurality of screws coupling the housing to the mounting bracket via the plurality of shafts;

the housing mounted flush to the dry wall via the mounting bracket and the nut plate.

17. The system of claim 16, wherein the nut plate and the housing are movable together along the slot in the first portion along a longitudinal axis of the mounting bracket, the system further comprising a baffle mounted over a front wall of the housing, the front wall perpendicular to the side wall and facing a room including the dry wall, a grill including a grill trim mounted in front of the baffle towards the room, and a compressible gasket between the baffle and the housing.

18. The system of claim 16, wherein a first width of the slot in the first portion is less than a second width of the slot in the second portion.

* * * * *